(12) United States Patent
Jung et al.

(10) Patent No.: US 11,465,275 B2
(45) Date of Patent: Oct. 11, 2022

(54) MOBILE ROBOT AND METHOD OF CONTROLLING THE SAME AND MOBILE ROBOT SYSTEM

(71) Applicant: Samsung Electronics Co., Ltd., Suwon-si (KR)

(72) Inventors: Jae-Young Jung, Yongin-si (KR); Young Do Kwon, Yongin-si (KR); Min Woo Ryu, Suwon-si (KR); Dong-Hyun Lee, Suwon-si (KR); Dong Hun Lee, Ansan-si (KR); Min Jae Kim, Seongnam-si (KR); Shin Kim, Hwaseong-si (KR); Woo Ram Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 271 days.

(21) Appl. No.: 16/647,846

(22) PCT Filed: Aug. 31, 2018

(86) PCT No.: PCT/KR2018/010127
§ 371 (c)(1),
(2) Date: Mar. 16, 2020

(87) PCT Pub. No.: WO2019/054676
PCT Pub. Date: Mar. 21, 2019

(65) Prior Publication Data
US 2020/0223056 A1    Jul. 16, 2020

(30) Foreign Application Priority Data

Sep. 14, 2017    (KR) .......................... 10-2017-0117505

(51) Int. Cl.
*G05D 1/00* (2006.01)
*B25J 9/00* (2006.01)
*A47L 11/40* (2006.01)

(52) U.S. Cl.
CPC ......... *B25J 9/0003* (2013.01); *A47L 11/4011* (2013.01); *A47L 11/4069* (2013.01);
(Continued)

(58) Field of Classification Search
None
See application file for complete search history.

(56) References Cited

U.S. PATENT DOCUMENTS 10,182,695 B2 *   1/2019   Halloran ............... A47L 9/0411
2006/0025887 A1   2/2006   Park
(Continued)

FOREIGN PATENT DOCUMENTS

EP       3111818 A1          1/2017
KR    10-2006-0011552 A      2/2006
(Continued)

OTHER PUBLICATIONS

Xiang-jin et al., Design of wireless communication module for outdoor mobile RobotZhang Xiang-jin, 2011, IEEE, p. 843-846 (Year : 2011).*

(Continued)

*Primary Examiner* — McDieunel Marc

(57) ABSTRACT

A mobile robot moving to a target position indicated by a user terminal, the mobile robot includes a driver configured to move the mobile robot; a communication interface configured to exchange a wireless signal with each of a first terminal transceiver and a second terminal transceiver included in the user terminal; and a controller configured to control the driver to move to the target position after transmission and reception of the wireless signal with the first terminal transceiver and transmission and reception of the wireless signal with the second terminal transceiver.

13 Claims, 24 Drawing Sheets

(52) U.S. Cl.
CPC ......... *G05D 1/0016* (2013.01); *G05D 1/0022* (2013.01); *G05D 2201/0203* (2013.01)

(56) References Cited

U.S. PATENT DOCUMENTS

| | | | |
|---|---|---|---|
| 2007/0250212 A1* | 10/2007 | Halloran | A47L 11/4011 700/245 |
| 2008/0009984 A1 | 1/2008 | Lee et al. | |
| 2016/0274579 A1 | 9/2016 | So et al. | |
| 2016/0375583 A1 | 12/2016 | Roh et al. | |
| 2018/0321687 A1* | 11/2018 | Chambers | G06F 16/29 |
| 2020/0242136 A1* | 7/2020 | Chambers | G05D 1/0285 |

FOREIGN PATENT DOCUMENTS

| | | |
|---|---|---|
| KR | 10-2008-0006074 A | 1/2008 |
| KR | 10-2015-0047893 A | 5/2015 |
| KR | 10-2016-0126968 A | 11/2016 |
| KR | 10-2017-0000282 A | 1/2017 |
| KR | 10-2017-0089074 A | 8/2017 |
| KR | 10-2153351 B1 | 9/2020 |

OTHER PUBLICATIONS

Zahugi et al., Libot: Design of a low cost mobile robot for outdoor swarm robotics, 2012, IEEE, p. 342-347 (Year: 2012).*
Hasan et al., Implementation of remotely controllable mobile robot system over mobile ad-hoc network, 2015, IEEE, p. 131-136 (Year: 2015).*
Moon et al., An integrated intelligent control architecture for mobile robot navigation within sensor network environment, 2004, IEEE, gp. 565-570 (Year: 2004).*
Notice of Preliminary Rejection dated Sep. 9, 2021, in connection with Korean Application No. 10-2017-0117505, 6 pages.
Notice of Patent Allowance dated Nov. 25, 2021, in connection with Korean Application No. 10-2017-0117505, 3 pages.
ISA/KR, International Search Report and Written Opinion of the International Searching Authority, International Application No. PCT/KR2018/010127, dated Jan. 2, 2019, 14 pages.

* cited by examiner

MOBILE ROBOT AND METHOD OF CONTROLLING THE SAME AND MOBILE ROBOT SYSTEM

CROSS-REFERENCE TO RELATED APPLICATIONS

This application is a 371 National Stage of International Application No. PCT/KR2018/010127, filed Aug. 31, 2018, which claims priority to Korean Patent Application No. 10-2017-0117505, filed Sep. 14, 2017, the disclosures of which are herein incorporated by reference in their entirety.

BACKGROUND

1. Field

The present disclosure relates to a mobile robot and a method of controlling the same, and a mobile robot system, and more particularly, to a mobile robot including the mobile robot and a user terminal for controlling movement of the mobile robot, and a method of controlling the same, and a mobile robot system.

2. Description of Related Art

Typically, a mobile robot is an apparatus that performs a specific task while driving about a cleaning space without user intervention. For example, the mobile robot is an apparatus that automatically cleans the cleaning space by sucking up impurities, such as dust on a floor. In other words, the mobile robot cleans the cleaning space while driving about the cleaning space.

In a conventional mobile robot, when a user wants to clean a specific position among the cleaning spaces, the user has to identify a position of the mobile robot and move the mobile robot to the specific position by using a remote controller.

However, when the user does not know the position of the mobile robot, the user has to find the mobile robot, thus the user has difficulty to find the mobile robot.

In order to move the mobile robot to the specific position, there is an inconvenience in that the user must operate the driving of the mobile robot by using the remote controller.

SUMMARY

An aspect of the present disclosure is to provide a mobile robot and a method of controlling the same, and a mobile robot system capable of detecting a position of a user terminal.

Another aspect of the present disclosure is to provide a mobile robot and a method of controlling the same, and a mobile robot system capable of detecting a direction indicated by a user terminal.

An aspect of the disclosure provides a mobile robot moving to a target position indicated by a user terminal, the mobile robot including: a driver configured to move the mobile robot; a communication interface configured to exchange a wireless signal with each of a first terminal transceiver and a second terminal transceiver included in the user terminal; and a controller configured to control the driver to move to the target position after transmission and reception of the wireless signal with the first terminal transceiver and transmission and reception of the wireless signal with the second terminal transceiver.

The controller may be configured to determine the target position based on a communication response time of the first terminal transceiver and a communication response time of the second terminal transceiver, and to control the driver to move to the target position.

The controller may be configured to determine a position of the user terminal and an indicating direction of the user terminal based on the communication response time of the first terminal transceiver and the communication response time of the second terminal transceiver, and to determine the target position based on the position of the user terminal and the indicating direction of the user terminal.

The controller may be configured to determine the position of the first terminal transceiver based on the communication response time of the first terminal transceiver, to determine the position of the second terminal transceiver based on the communication response time of the second terminal transceiver, and to determine the position of the user terminal and the indicating direction of the user terminal based on the position of the first terminal transceiver and the position of the second terminal transceiver.

The communication interface may include a first robot transceiver, a second robot transceiver, and a third robot transceiver. The controller may be configured to determine the position of the first terminal transceiver based on a communication response time between each of the first, second, and third robot transceivers and the first terminal transceiver, and to determine the position of the second terminal transceiver based on a communication response time between each of the first, second, and third robot transceivers and the second terminal transceiver.

The communication interface may include a first robot transceiver. The controller may be configured to determine the position of the first terminal transceiver based on a communication response time between the first robot transceiver and the first terminal transceiver while the mobile robot turns in the same place, and to determine the position of the second terminal transceiver based on a communication response time between the first robot transceiver and the second terminal transceiver while the mobile robot turns in the same place.

The communication interface may include a first robot transceiver, a second robot transceiver, and a third robot transceiver. The controller may be configured to determine the target position based on a communication response time between each of the first, second, and third robot transceivers and the first terminal transceiver and a communication response time between each of the first, second, and third robot transceivers and the second terminal transceiver.

The communication interface comprises a first robot transceiver. The controller may be configured to determine the target position based on a communication response time between the first robot transceiver and the first terminal transceiver and a communication response time between the first robot transceiver and the second terminal transceiver while the mobile robot turns in the same place.

Another aspect of the disclosure provides a method of controlling a mobile robot for moving the mobile robot to a target position indicated by a user terminal, the method including: exchanging, by a communication interface, wireless signals with each of a first terminal transceiver and a second terminal transceiver included in the user terminal; determining, by a controller, the target position based on a communication response time of the first terminal transceiver and a communication response time of the second terminal transceiver; and moving, by a driver, the mobile robot to the target position.

The determining of the target position may include determining a position of the user terminal and an indicating direction of the user terminal based on the communication response time of the first terminal transceiver and the communication response time of the second terminal transceiver; and determining the target position based on the position of the user terminal and the indicating direction of the user terminal.

The determining of the position of the user terminal and the indicating direction of the user terminal may include determining the position of the first terminal transceiver based on the communication response time of the first terminal transceiver; determining the position of the second terminal transceiver based on the communication response time of the second terminal transceiver; and determining the position of the user terminal and the indicating direction of the user terminal based on the position of the first terminal transceiver and the position of the second terminal transceiver.

The determining of the position of the first terminal transceiver may include determining the position of the first terminal transceiver based on a communication response time between each of first, second, and third robot transceivers included in the mobile robot and the first terminal transceiver. The determining of the position of the second terminal transceiver may include determining the position of the second terminal transceiver based on a communication response time between each of the first, second, and third robot transceivers included in the mobile robot and the second terminal transceiver.

The determining of the position of the first terminal transceiver may include determining the position of the first terminal transceiver based on a communication response time between a first robot transceiver included in the mobile robot and the first terminal transceiver while the mobile robot turns in the same place. The determining of the position of the second terminal transceiver may include determining the position of the second terminal transceiver based on a communication response time between the first robot transceiver and the second terminal transceiver while the mobile robot turns in the same place.

The determining of the target position may include determining the target position based on a communication response time between each of first, second, and third robot transceivers included in the mobile robot and the first terminal transceiver and a communication response time between each of the first, second, and third robot transceivers and the second terminal transceiver.

The determining of the target position may include determining the target position based on a communication response time between a first robot transceiver included in the mobile robot and the first terminal transceiver and a communication response time between the first robot transceiver and the second terminal transceiver while the mobile robot turns in the same place.

Another aspect of the disclosure provides a mobile robot system including: a user terminal configured to indicate a target position and including a first terminal transceiver and a second terminal transceiver arranged in a line toward the target position; and a mobile robot configured to move toward the target position. The mobile robot may include a driver configured to move the mobile robot; a communication interface configured to exchange a wireless signal with each of the first terminal transceiver and the second terminal transceiver; and a controller configured to determine the target position based on a communication response time of the first terminal transceiver and a communication response time of the second terminal transceiver, and to control the driver to move to the target position.

According to an embodiment of the present disclosure, provided is a mobile robot and a method of controlling the same, and a mobile robot system, which is capable of detecting a position of a user terminal.

According to another embodiment of the present disclosure, provided is a mobile robot and a method of controlling the same, and a mobile robot system, which is capable of detecting a direction indicated by a user terminal.

DETAILED DESCRIPTION

Figure 1:
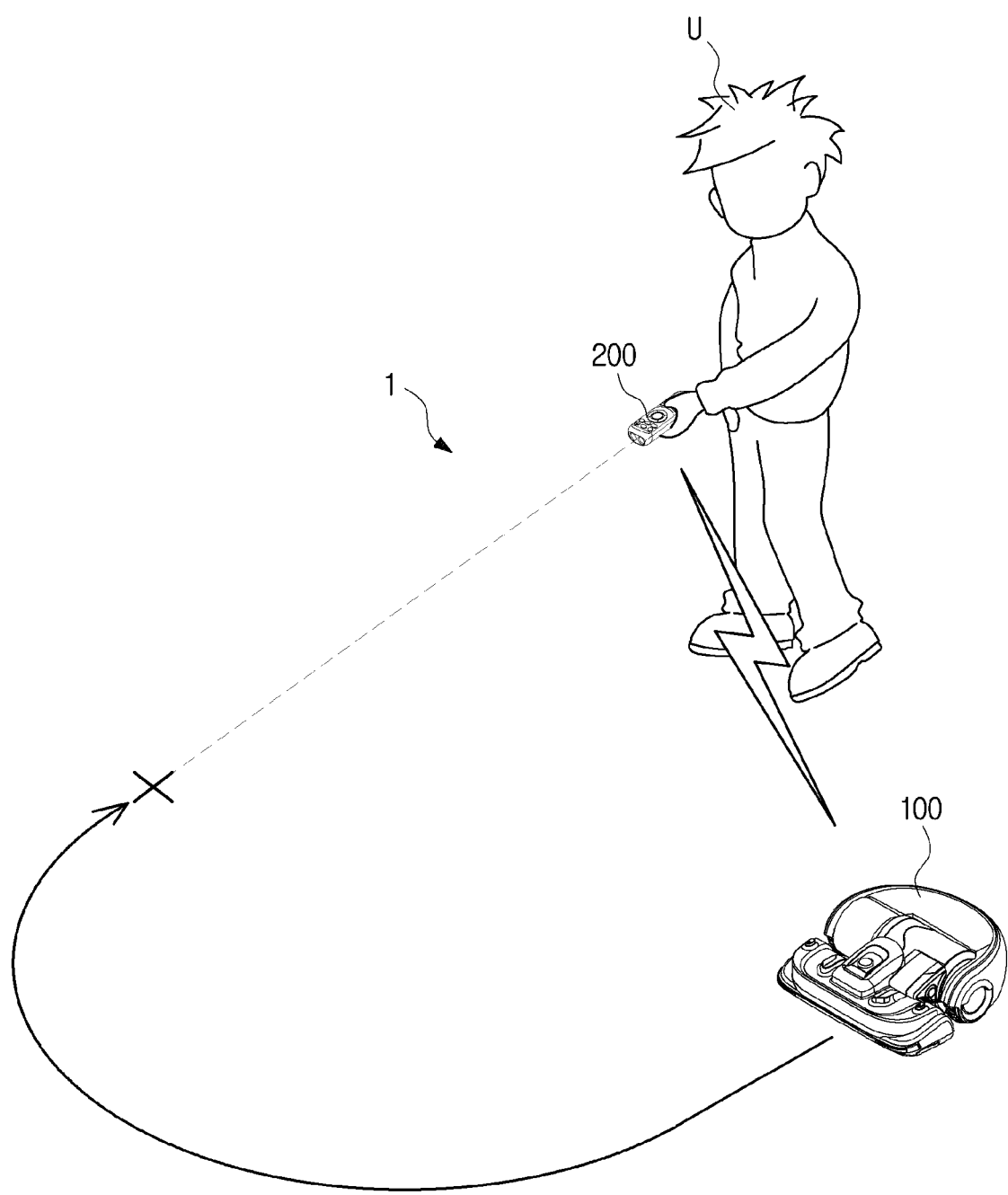
FIG. 1 is a view schematically illustrating a configuration and operation of a mobile robot system according to an embodiment.

Like reference numerals refer to like elements throughout the specification. Not all elements of embodiments of the disclosure will be described, and description of what are commonly known in the art or what overlap each other in the embodiments will be omitted. The terms as used throughout the specification, such as "~part," "~module," "member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

Further, when it is stated that a layer is "on" another layer or substrate, the layer may be directly on another layer or substrate or a third layer may be disposed therebetween.

It will be understood that, although the terms first, second, third, etc., may be used herein to describe various elements, it should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

Hereinafter, the operation principles and embodiments of the disclosure will be described with reference to the accompanying drawings.

FIG. 1 is a view schematically illustrating a configuration and operation of a mobile robot system according to an embodiment.

Referring to FIG. 1, a mobile robot system 1 may include a mobile robot 100 driving on a floor and a user terminal 200 controlling the driving of the mobile robot 100.

The mobile robot 100 may drive on the floor of a driving space.

For example, the mobile robot 100 may automatically and/or manually drive on the floor in a house of a user U. The mobile robot 100 may automatically recognize a structure of the house and a position of obstacles, and may drive on the floor of the house while avoiding walls, furniture, etc. in the house according to the structure of the house and the position of the obstacles. Here, the obstacles may represent any object that can interfere with the driving of the mobile robot 100, such as the furniture and walls.

The mobile robot 100 may manually drive on the floor of the house by the operation of the user U. The user U may control the driving of the mobile robot 100 through the user terminal 200, and the mobile robot 100 may be adjusted by a driving speed and/or a driving direction according to a driving control signal from the user terminal 200.

The user U may indicate a target position T to which the mobile robot 100 moves through the user terminal 200. The mobile robot 100 may automatically move to the target position T indicated by the user terminal 200.

The mobile robot 100 is not limited to driving indoors, and the mobile robot 100 may drive outdoors. The mobile robot 100 may drive outdoors automatically recognizing obstacles or the like, or may drive outdoors according to the control of the user U through the user terminal 200.

The mobile robot 100 may perform various tasks while driving.

For example, the mobile robot 100 may clean on the floor of the house while driving in the house of the user U. Particularly, the mobile robot 100 may automatically sweep and suck dust on the floor of the house while driving in the user's house. In addition, the mobile robot 100 may suck the dust around the target position T after moving to the target position T indicated by the user terminal 200.

The mobile robot 100 is not limited to cleaning on the floor while driving. For example, the mobile robot 100 may carry objects while driving.

The user terminal 200 may receive a user input of the user U and transmit a user control signal corresponding to the user input to the mobile robot 100.

For example, the user terminal 200 may receive the user input regarding driving and/or cleaning of the mobile robot 100, and may transmit a driving control signal for controlling the driving of the mobile robot 100 and/or a cleaning control signal for controlling the cleaning of the mobile robot 100 to the mobile robot 100. The mobile robot 100 may drive on the floor of the house and clean the floor of the house in response to the reception of the driving control signal and/or the cleaning control signal.

The user terminal 200 may receive the user input for designating the target position T from the user U and transmit a mobile signal to the mobile robot 100 at the target position T. The mobile robot 100 may determine the position of the target position T in response to the mobile signal at the target position T, and may automatically move toward the target position T.

The mobile robot 100 may determine a position of the user terminal 200 in order to calculate the target position T, and may determine a direction indicated by the user terminal 200 (hereinafter referred to as 'indicating direction of an abnormal user terminal'). In addition, the mobile robot 100 may communicate with the user terminal 200 to determine the position of the user terminal 200 and/or the indicating direction of the user terminal 200.

As such, the mobile robot 100 may receive the driving control signal and/or the cleaning control signal from the user terminal 200 through communication with the user terminal 200, and may drive in the house according to the driving control signal and/or the cleaning control signal to clean the house.

In particular, the mobile robot 100 may receive the mobile signal at the target position T through communication with the user terminal 200, and may determine the position of the target position T through communication with the user terminal 200. The mobile robot 100 may move to the target position T and clean around the target position T afterwards.

Hereinafter, respective configurations of the mobile robot 100 and the user terminal 200 and the functions of the respective configurations will be described.

Figure 2:
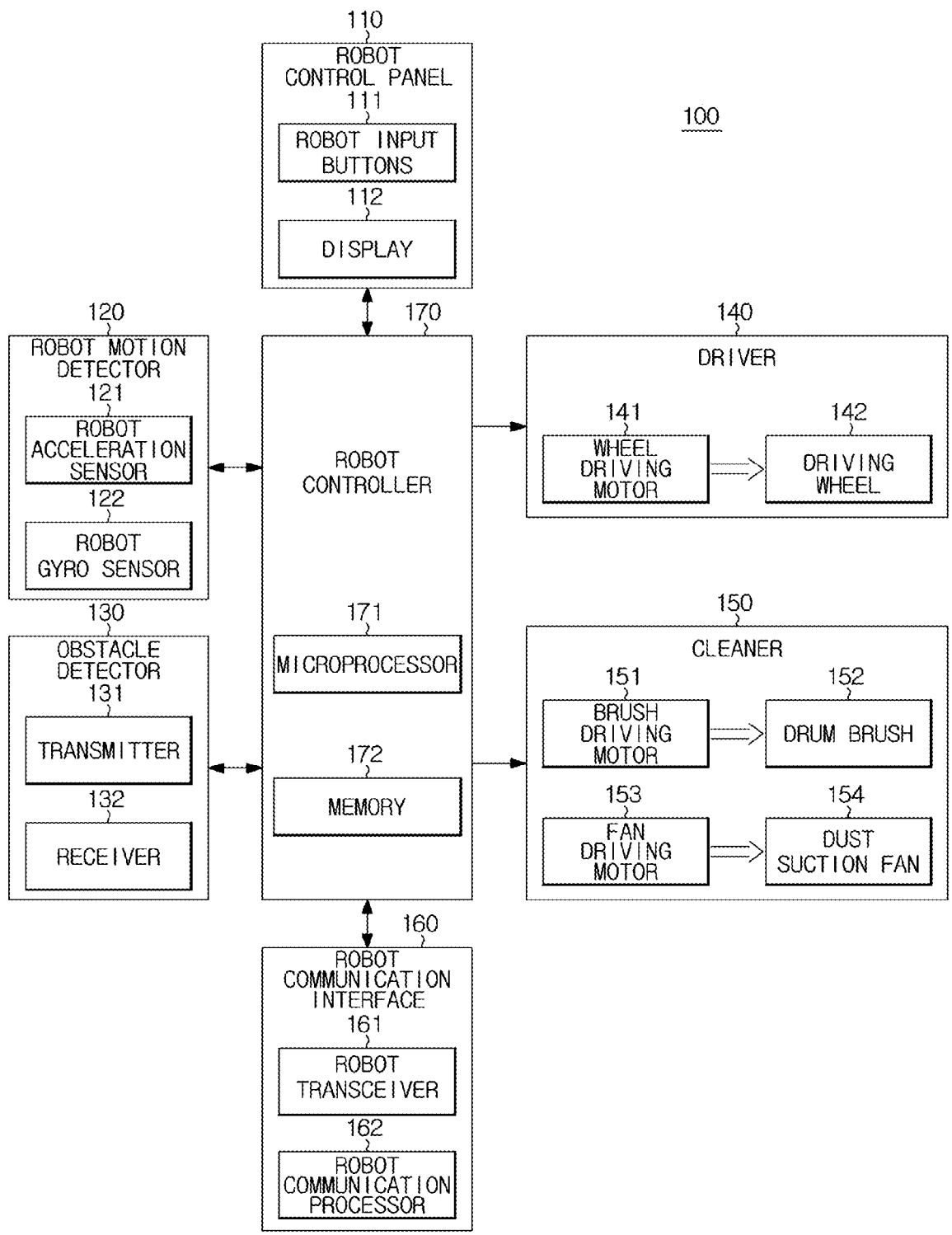
FIG. 2 is a block diagram of a mobile robot according to an embodiment.
Figure 3:
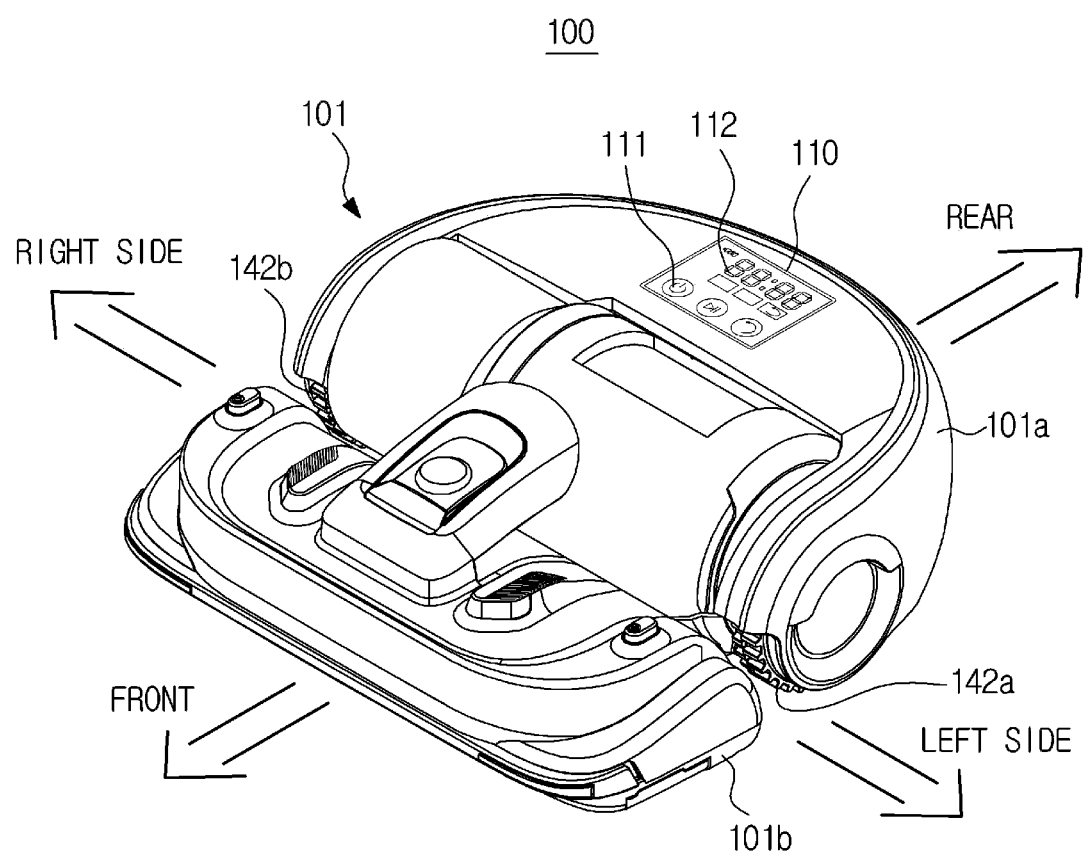
FIG. 3 is a view illustrating an appearance of a mobile robot according to an embodiment.
Figure 4:
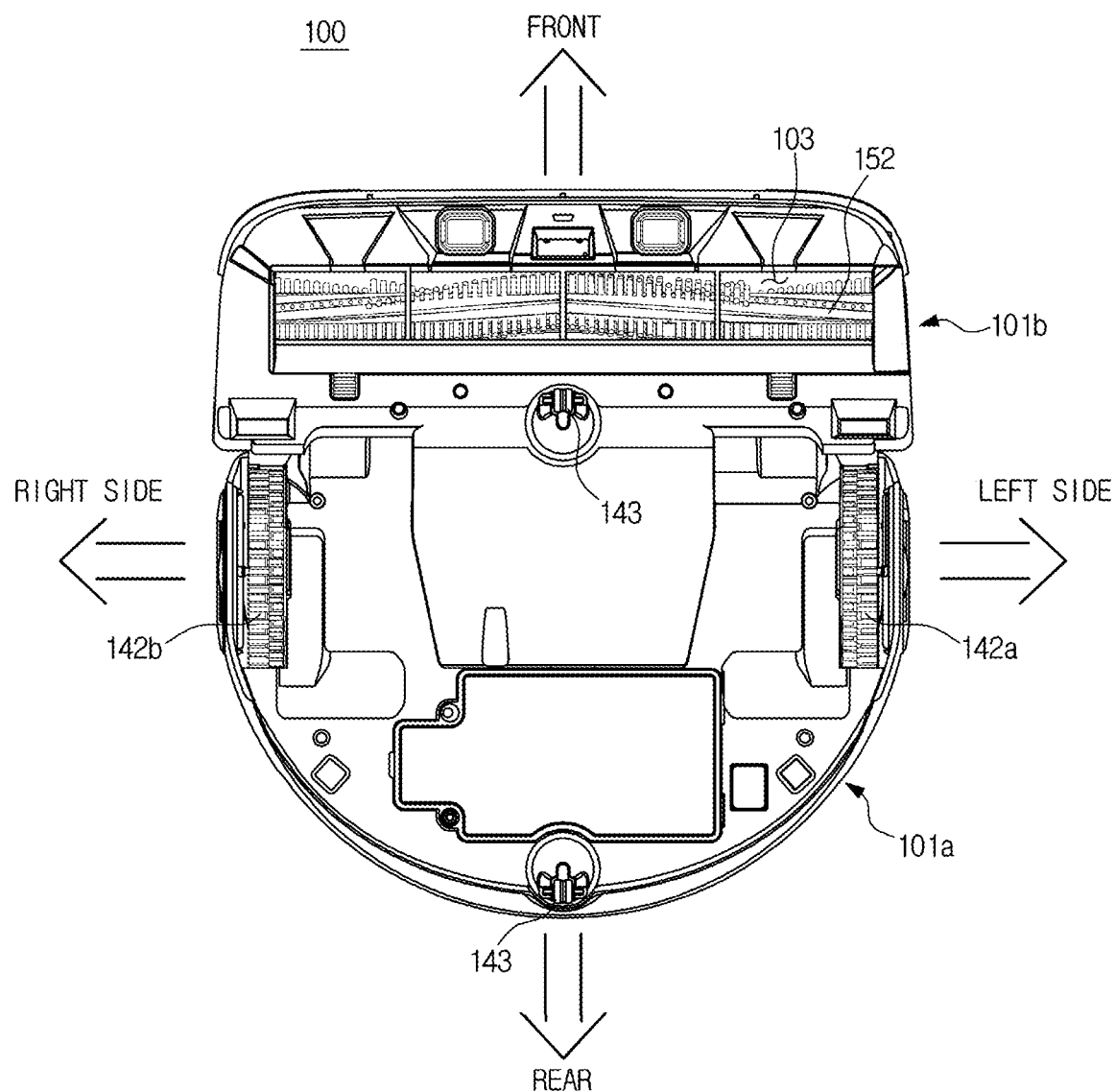
FIG. 4 is a view illustrating a bottom surface of a mobile robot according to an embodiment.
Figure 5:
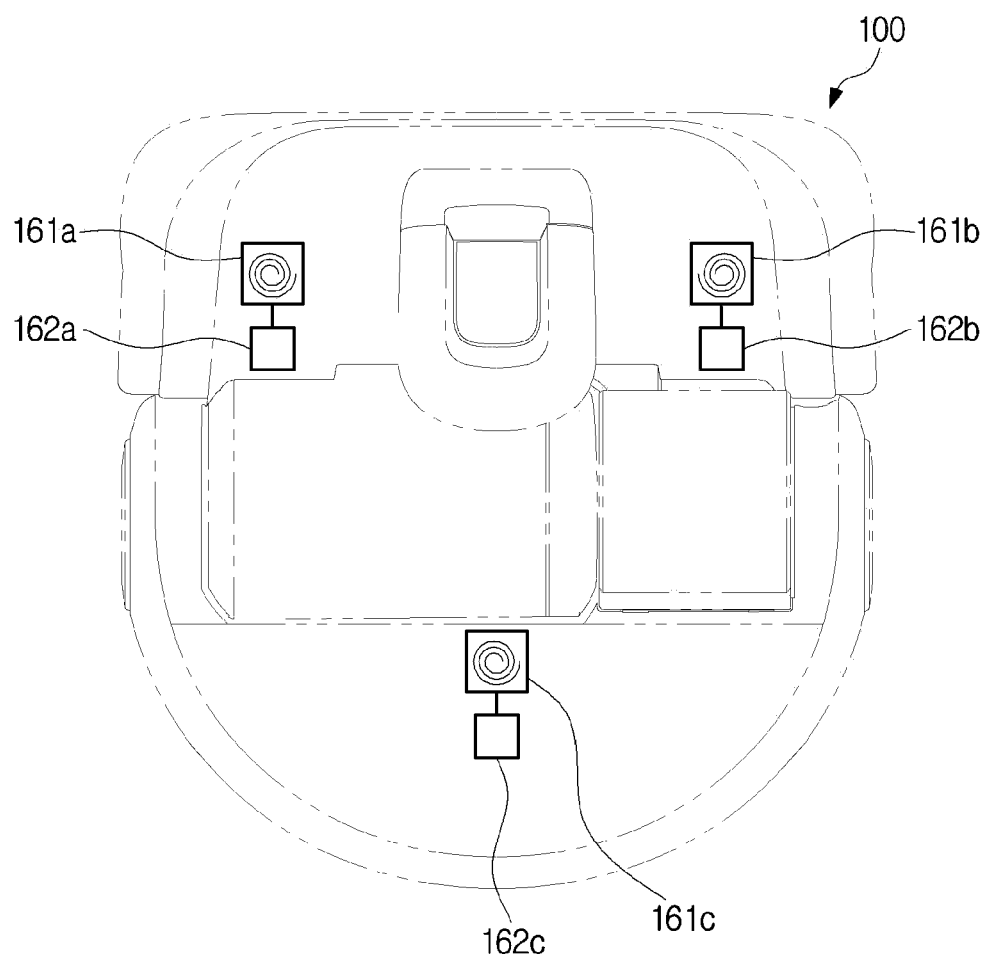
FIG. 5 is a view illustrating an example of a robot communication interface included in a mobile robot according to an embodiment.
Figure 6:
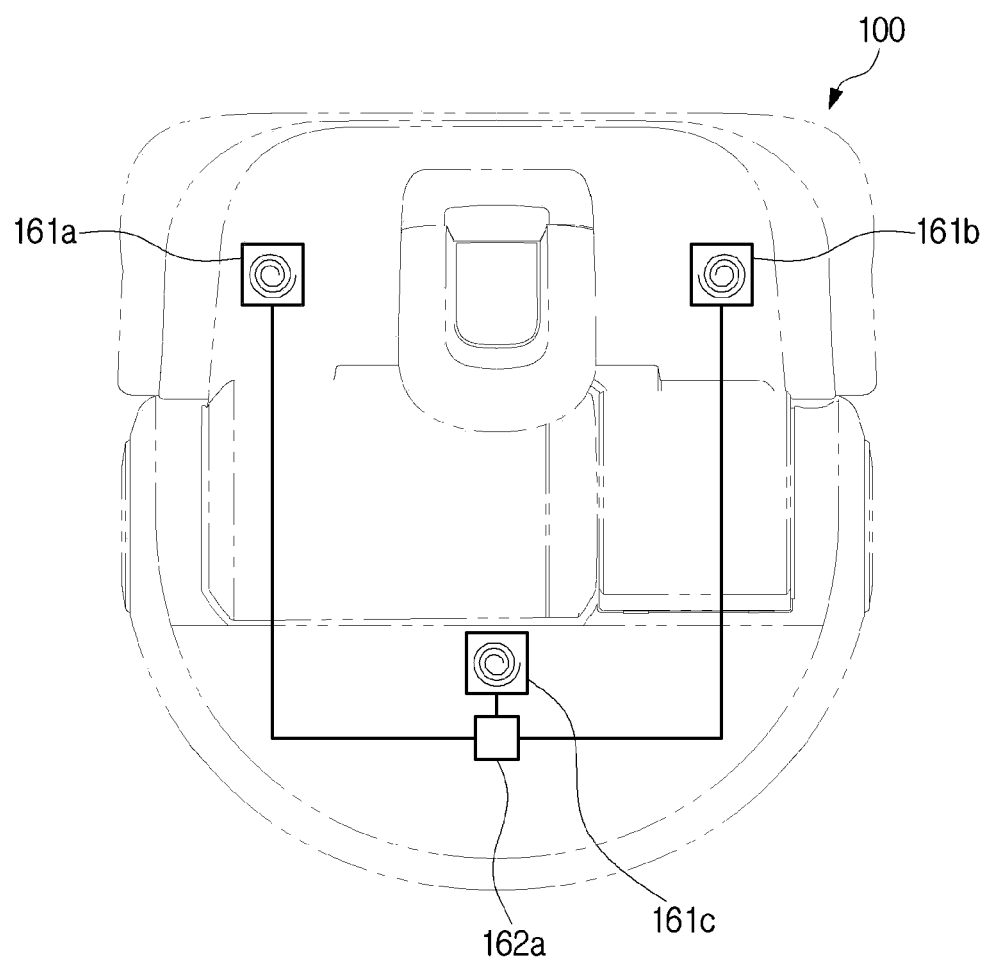
FIG. 6 is a view illustrating another example of a robot communication interface included in a mobile robot according to an embodiment.
Figure 7:
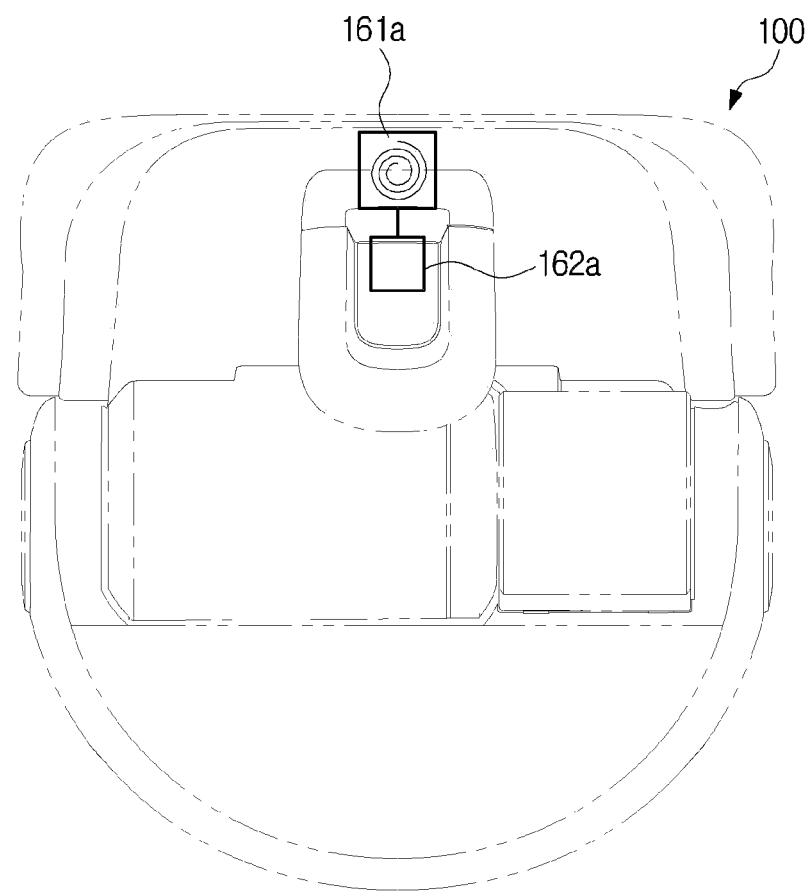
FIG. 7 is a view illustrating another example of a robot communication interface included in a mobile robot according to an embodiment.

FIG. 2 is a block diagram of a mobile robot according to an embodiment. FIG. 3 is a view illustrating an appearance of a mobile robot according to an embodiment. FIG. 4 is a view illustrating a bottom surface of a mobile robot according to an embodiment. FIG. 5 is a view illustrating an example of a robot communication interface included in a mobile robot according to an embodiment. FIG. 6 is a view illustrating another example of a robot communication interface included in a mobile robot according to an embodiment. FIG. 7 is a view illustrating another example of a robot communication interface included in a mobile robot according to an embodiment.

Referring to FIGS. 2, 3, 4, 5, 6, and 7, the mobile robot 100 may include a robot body 101, and the robot body 101 may accommodate components constituting the mobile robot 100 and protect the components from external forces.

The robot body 101 may include a main body 101a and a sub body 101b. The main body 101a may have an approximately semicircular shape, and the sub body 101b may have an approximately rectangular shape. The main body 1101a and the sub body 101b are designed to perform optimum cleaning, and the main body 101a is not limited to the approximately semicircular shape and the sub body 101b is not limited to the approximately rectangular shape.

Interior and exterior parts of the robot body 101 may include a robot control panel 110 for interacting with the user U, a robot motion detector 120 for detecting movement of the mobile robot 100, a robot obstacle detector 130 for detecting obstacles placed on the floor, a driver 140 for moving the mobile robot 100, a cleaner 150 for cleaning the floor, a robot communication interface 160 for communicating with the user terminal 200, and a robot controller 170 for controlling the operation of the mobile robot 100. However, the configuration of the mobile robot 100 is not limited to that illustrated in FIG. 2, and other configurations may be added or the parts thereof may be omitted as necessary.

The robot control panel 110 may be disposed at a top surface of the robot body 101, and may include a plurality of robot input buttons 111 for receiving a control command from the user and a robot display 123 for displaying operation information of the mobile robot 100.

The robot input buttons 111 may include a plurality of the buttons for receiving various user inputs. For example, the robot input buttons 111 may include a power button to turn the mobile robot 100 on or off, an operation button to operate or stop the mobile robot 100, and a return button for returning to a charging station.

Each of the plurality of buttons included in the robot input buttons 111 may receive the user input and output the user control signal corresponding to the user input to the robot controller 170. In addition, each of the plurality of buttons included in the robot input buttons 111 may be implemented by various input devices such as a push switch, a touch switch, a dial, a slide switch, a toggle switch, and the like.

The robot display 112 may display the operation information of the mobile robot 100 in response to the user input. For example, the robot display 112 may display the operation state of the mobile robot 100, the power state, a user-selected cleaning mode, information indicating whether to return to the charging station, etc.

The robot display 112 may be implemented by various display devices such as a liquid crystal display (LCD) panel, a light emitting diode (LED), or an organic light emitting diode (OLED) panel. In addition, the robot display 112 may also be implemented as a touch screen panel (TSP) that receives the user input and displays the operation information of the mobile robot 100.

The robot motion detector 120 may detect the movement and a posture of the mobile robot 100 while the mobile robot 100 drives in the driving space. For example, the robot motion detector 120 may detect linear moving acceleration, a linear moving speed, a linear moving displacement, a linear moving direction, tilting, a rotational moving angular velocity, and a rotational moving angular displacement and/or a rotational direction (axial direction of rotational movement) of the mobile robot 100 while the mobile robot 100 moves.

The robot motion detector 120 may include a robot acceleration sensor 121 to detect linear movement of the mobile robot 100, and a robot gyro sensor 122 to detect rotational movement of the mobile robot 100.

The robot acceleration sensor 121 may measure x-axis acceleration, y-axis acceleration, and/or z-axis acceleration (three-axis linear acceleration) due to the linear movement of the mobile robot 100.

For example, the robot acceleration sensor 121 may measure the linear moving acceleration of the mobile robot 100 based on acceleration (gravity acceleration) caused by the earth's gravity. The robot acceleration sensor 121 may measure a vector sum of the gravity acceleration and the linear moving acceleration, and may determine the linear moving acceleration from the measured value. The robot acceleration sensor 121 may calculate the linear moving speed of the mobile robot 100 from the linear moving acceleration of the mobile robot 100, and may calculate the linear movement of the mobile robot 100 from the linear moving speed of the mobile robot 100.

In addition, the robot acceleration sensor 121 may determine the posture of the mobile robot 100 based on the change in the direction of the gravity acceleration.

The robot gyro sensor 122 may measure the angular velocity (rotational speed) of the center of the x-axis, the angular velocity of the center of the y-axis and/or the angular velocity of the center of the z-axis (three-axis angular velocity) by the rotational movement of the mobile robot 100.

For example, the robot gyro sensor 122 may measure the rotational moving angular velocity of the mobile robot 100 by using Coriolis force due to rotation. The robot gyro sensor 122 may measure the Coriolis force and determine the rotational moving angular velocity of the mobile robot 100 from the Coriolis force.

The robot gyro sensor 122 may calculate the rotational moving displacement of the mobile robot 100 from the rotational moving angular velocity of the mobile robot 100.

As such, the robot motion detector 120 may output information about the movement such as the linear moving acceleration, the linear moving speed, the linear moving displacement, the linear moving direction, the rotational moving angular velocity, the rotational moving angular displacement and/or the rotational direction (axial direction of rotational movement) of the mobile robot 100 and information about the posture such as the tilting of the mobile robot 100 to the robot controller 170.

In addition, the robot motion detector 120 may further include an encoder and/or a hall sensor for detecting the rotation of a driving wheel 142 included in the mobile robot 100 together with the robot acceleration sensor 121 and/or the robot gyro sensor 122. In addition, the robot motion detector 120 may determine the linear moving speed, the linear moving displacement, the rotational moving speed and the rotational moving displacement of the mobile robot 100 based on the rotation of the driving wheel 142.

The robot obstacle detector 130 may detect e obstacle obstructing the movement of the mobile robot 100. In this case, the obstacle may represent any object or structure that protrudes from the bottom of the driving space and obstructs the movement of the mobile robot 100 or is recessed from the bottom of the driving space and obstructs the movement of the mobile robot 100. For example, the obstacle may include furniture such as a table or chair, a wall partitioning the house, a front door lower than the bottom of the house, or the like. The robot obstacle detector 130 may include a transmitter 131 for transmitting a detecting medium (for example, light or ultrasonic waves or radio waves) toward the front on which the mobile robot 100 drives and a receiver 132 for receiving the detecting medium reflected from the obstacle.

The transmitter 131 may include an LED for transmitting light or an ultrasonic speaker for transmitting ultrasonic waves or an antenna for transmitting radio waves. While the mobile robot 100 is driving, light or ultrasonic waves or radio waves may be transmitted toward the front of the mobile robot 100 (that is, the driving direction of the mobile robot).

The detecting medium transmitted from the transmitter 131 may propagate toward the front of the mobile robot 100. When the obstacle is located in front of the mobile robot 100, the light or the ultrasonic waves or the radio waves are reflected on the obstacle, and the reflected detecting medium may propagate toward the mobile robot 100.

The receiver 132 may include a photodiode for receiving light or a microphone for receiving ultrasonic waves or an antenna for receiving radio waves, or the like. While the mobile robot 100 is driving, the light or the ultrasonic waves or the radio waves reflected from the obstacle located in front of the mobile robot 100 may be received.

The robot obstacle detector 130 may determine whether there is the obstacle located in front of the mobile robot 100 according to whether the receiver 132 receives the detecting medium. In addition, the robot obstacle detector 130 may determine the position of the obstacle (distance between the mobile robot and the obstacle) located in front of the mobile robot 100 from a strength of the detected medium detected by the receiver 132 and/or a time difference between the transmission and reception of the detecting medium.

As such, the robot obstacle detector 130 may output the information about the obstacle, such as whether the obstacle is located in front of the mobile robot 100 and/or the position of the obstacle, to the robot controller 170.

The driver 140 may move the mobile robot 100. In detail, the driver 140 may linearly or rotationally move the mobile robot 100 according to a driving control signal of the robot controller 170.

The driver 140 may include a wheel driving motor 141, the driving wheel 142, and a caster wheel 143.

The driving wheel 142 may be disposed at both sides of the left and right of the robot body 101, and may include a left driving wheel 142*a* disposed to the left side of the robot body 101 and a right end of the robot body 101 disposed to the right side of the robot body 101.

The wheel driving motor 141 may generate a rotational force needed to rotate the driving wheel 142, and may include a left driving motor 141*a* to rotate the left driving wheel 142*a* and a right driving motor 141*b* to rotate a right driving wheel 142*b*.

Each of the left driving motor 141*a* and the right driving motor 141l) may receive the driving control signals from the robot controller 170 and independently rotate the left driving wheel 142*a* and the right driving wheel 142*b*. As a result, the left driving wheel 142*a* and the right driving wheel 142*b* may rotate independently.

By the rotation of the left driving wheel 142*a* and the right driving wheel 142*b*, the mobile robot 100 may drive in various patterns such as straight driving, curved driving, and turn in the same place.

For example, when the left driving wheel 142*a* and the right driving wheel 142*b* are rotated in the same direction at the same speed, the mobile robot 100 may perform the straight driving. When the left driving wheel 142*a* and the right driving wheel 142*b* are rotated in the same direction at different speeds, the mobile robot 100 may perform the curved driving. Also, when the left driving wheel 142*a* and the right driving wheel 142*b* are rotated in different directions at the same speed, the mobile robot 100 may turn in the same place.

The caster wheel 143 may be installed at the bottom of the robot body 101 and may support the mobile robot 100 so that the mobile robot 100 moves smoothly. The caster wheel 143 may not only rotate about a rotation axis parallel to a bottom surface, but also may rotate about a rotation axis perpendicular to the bottom surface. Therefore, the caster wheel 143 may change the direction of the rotation axis according to the moving direction of the mobile robot 100.

In addition, the driver 140 may further include a motor driving circuit for supplying a driving current to the wheel driving motor 141 according to the driving control signal of the robot controller 170, a power transmission device for transmitting the rotational force of the wheel driving motor 141 to the driving wheel 142, and a rotation sensor for detecting the rotational displacement and/or rotational angular velocity of the wheel driving motor 141 or the driving wheel 142.

The cleaner 150 may include a drum brush 152 to scatter dirt or dust from the floor to be cleaned, a brush driving motor 151 to rotate the drum brush 152, a dust suction fan 154 to suck in the scattered dust, and a fan driving motor 153 to rotate the dust suction fan 154.

The drum brush 152 may be provided at a dust inlet 103 formed at the bottom of the robot body 101 (for example, the sub body), and may rotate about the rotation axis provided in a direction parallel to the floor to be cleaned, so that the dust from the floor to be cleaned is scattered into the dust inlet 103.

The brush driving motor 151 may be provided adjacent to the drum brush 152 to rotate the drum brush 152 according to the cleaning control signal of the robot controller 170.

In addition, the cleaner 150 may include a motor driving circuit for supplying the driving current to the brush driving motor 151 according to the cleaning control signal of the robot controller 170 and a power transmission device for transmitting the rotational force of the brush driving motor 151 to the drum brush 152.

The dust suction fan 154 may be provided inside the robot body 101 (for example, the main body) to suck dust scattered by the drum brush 152.

The fan driving motor 153 is provided at a position adjacent to the dust suction fan 154 and may rotate the dust suction fan 154 according to the cleaning control signal of the robot controller 170.

The cleaner 150 may further include the motor driving circuit for supplying the driving current to the fan driving motor 153 according to the cleaning control signal of the robot controller 170, the power transmission device for transmitting the rotational force of the fan driving motor 153 to the dust suction fan 154, and a dust box for storing the dust sucked by the dust suction fan 154.

The robot communication interface 160 may exchange communication data with the user terminal 200. The communication data may be transmitted by various media. For example, the communication data may be transmitted through light or ultrasonic waves or radio waves.

In the following, it is assumed that the communication data is transmitted through radio waves for better understanding. In particular, the robot communication interface 160 may exchange the communication data with the user terminal 200 using an ultra-wideband (UWB) communication method.

The UWB communication method may refer to a communication scheme in which a bandwidth of a wireless signal is 25% or more of the center frequency of the wireless signal or a communication scheme in which the bandwidth of the wireless signal is 500 MHz (mega-hertz) or more. The wireless signal according to the UWB communication method (hereinafter referred to as 'UWB wireless signal') may be a short impulse signal having a pulse width of 1 ns (nano-second) or less. By changing a shape of the impulse signal (e.g., positive and negative impulse signals), the UWB wireless signal may transmit data (e.g., '0' and '1' digital data).

The robot communication interface 160 may include a robot transceiver 161 for transmitting and receiving the UWB wireless signal, and a robot communication processor 162 for generating the UWB wireless signal to be transmitted and processing the received UWB wireless signal.

The robot transceiver 161 may receive the UWB wireless signal from a free space or transmit the UWB wireless signal to the free space. For example, the robot transceiver 161 may include an antenna for receiving the UWB wireless signal from the free space or transmitting the UWB wireless signal to the free space and an amplifier for amplifying the received MB wireless signal.

The robot communication processor 162 may generate the UWB wireless signal according to a communication control signal of the robot controller 170. For example, the robot communication processor 162 may generate the UWB wireless signal corresponding to the communication data to be transmitted.

The robot communication processor 162 may process the UWB wireless signal received by the robot transceiver 161. For example, the robot communication processor 162 may extract the communication data from the UWB wireless signal and output the extracted communication data to the robot controller 170.

The robot communication interface 160 may include one or more of the robot transceivers 161 and one or more of the robot communication processors 162.

For example, as illustrated in FIG. 5, the robot communication interface 160 may include three of the robot transceivers 161 and three of the robot communication processors 162.

The robot communication interface 160 may include a first robot transceiver 161a, a second robot transceiver 161b, and a third robot transceiver 161c. The first robot transceiver 161a is located at the front left side of the robot body 101, the second robot transceiver 161b is located at the front right side of the robot body 101, and the third robot transceiver 161c is located at the rear center of the robot body 101. In addition, the first robot transceiver 161a, the second robot transceiver 161b, and the third robot transceiver 161c may be spaced apart from each other by a predetermined distance a.

The robot communication interface 160 may further include a first robot communication processor 162a, a second robot communication processor 162b, and a third robot communication processor 162c. The first robot communication processor 162a, the second robot communication processor 162b, and the third robot communication processor 162c may be installed at positions adjacent to the first robot transceiver 161a, the second robot transceiver 161b, and the third robot transceiver 161c, respectively.

The first robot communication processor 162a may process the UWB wireless signal transmitted and received through the first robot transceiver 161a, and the second robot communication processor 162b may process the UWB wireless signal transmitted and received through the second robot transceiver 161b. In addition, the third robot communication processor 162c may process the LTWB wireless signal transmitted and received through the third robot transceiver 161c.

As another example, as illustrated in FIG. 6, the robot communication interface 160 may include three of the robot transceivers 161 and one of the robot communication processors 162.

The robot communication interface 160 may include the first robot transceiver 161a, the second robot transceiver 161b, and the third robot transceiver 161c. The first robot transceiver 161a is located at the front left side of the robot body 101, the second robot transceiver 161b is located at the front right side of the robot body 101, and the third robot transceiver 161c is located at the rear center of the robot body 101. In addition, the first robot transceiver 161a, the second robot transceiver 161b, and the third robot transceiver 161c may be spaced apart from each other by the predetermined distance a.

The robot communication interface 160 may further include the first robot communication processor 162a, and the first robot communication processor 162a may be installed at any position.

The first robot communication processor 162a may sequentially process the UWB wireless signal transmitted and received through the first robot transceiver 161a and the UWB wireless signal transmitted and received through the second robot transceiver 161b, and the UWB wireless signal transmitted and received through the third robot transceiver 161c.

As another example, as illustrated in FIG. 7, the robot communication interface 160 may include one of the robot transceivers 161 and one of the robot communication processors 162.

The robot communication interface 160 may include the first robot transceiver 161a and the first robot communication processor 162a. The first robot transceiver 161a may be installed at the front center of the robot body 101. The first robot communication processor 162a may be installed at the position adjacent to the first robot transceiver 161a.

The first robot communication processor 162a may process the UWB wireless signal transmitted and received through the first robot transceiver 161a.

The robot communication interface 160 may exchange the communication data with the user terminal 200 using the UWB communication method. The robot communication interface 160 may exchange the UWB wireless signal with the user terminal 200 to measure the distance between the user terminal 200 and the robot transceiver 161.

For example, the robot communication interface 160 may transmit a detection signal through the robot transceiver 161 and receive a response signal from the user terminal 200. The robot communication interface 160 may measure a response time interval between the transmission of the detection signal and the reception of the response signal in response to the reception of the response signal of the user terminal 200.

The robot communication interface 160 may calculate a wireless signal propagation time by subtracting a detection signal processing time of the user terminal 200 from the response time interval, and may determine a distance between the user terminal 200 and the robot transceiver 161 from the wireless signal propagation time. In addition, the robot communication interface 160 may output information about the distance between the user terminal 200 and the robot transceiver 161 to the robot controller 170.

For example, when the robot communication interface 160 includes three of the robot transceivers 161, the robot communication interface 160 may transmit a detection signal through the first robot transceiver 161a and receive the response signal of the user terminal 200 through the first robot transceiver 161a, and may calculate a first distance d1 between the first robot transceiver 161a and the user terminal 200 based on a difference between a transmission time of the detection signal and a reception time of the response signal. In the same way, the robot communication interface 160 may calculate a second distance d2 between the second robot transceiver 161b and the user terminal 200 and a third distance d3 between the third robot transceiver 161c and the user terminal 200.

In addition, when the robot communication interface 160 includes one of the robot transceivers 161, the robot communication interface 160 may output distances between the first robot transceiver 161a and the user measured dining the movement of the mobile robot 100 to the robot controller 170.

The robot controller 170 may process the user input of the robot control panel 110, motion information of the robot motion detector 120, and obstacle information of the robot obstacle detector 130. The robot controller 170 may drive the driving control signal to the driver 140, may output the cleaning control signal to the cleaner 150, and may output the communication control signal and/or the communication data to the robot communication interface 160.

In addition, the robot controller 170 may determine the target position T indicated by the user terminal 200 and control the driver 140 to move toward the target position T. Particularly, the robot controller 170 may control the robot communication interface 160 to measure the distance between the robot transceiver 161 and the user terminal 200, and may determine the position of the user terminal 200 based on the distance between the robot transceiver 161 and the user terminal 200.

The robot controller 170 may include a memory 172 and a microprocessor 171.

The memory 172 may store a program and data needed to control the mobile robot 100. For example, the memory 172 may include a program for processing the motion information output from the robot motion detector 120, a program for processing the obstacle information output from the robot obstacle detector 130, and a program for processing the communication data output from the robot communication interface 160.

In addition, the memory 172 may temporarily store data generated during a processing operation of the microprocessor 171. For example, the memory 172 may store temporary data generated while the microprocessor 171 processes the motion information or the obstacle information or the communication data.

The memory 172 may include volatile memories such as static random access memory (S-RAM) and dynamic random access memory (D-RAM) for temporarily storing data, and non-volatile memories, for example, read only memory (ROM), erasable programmable read only memory (EPROM), electrically erasable programmable read only memory (EPROM), and flash memory for storing data for a long period of time.

The microprocessor 171 may process the motion information output from the robot motion detector 120 and the obstacle information output from the robot obstacle detector 130 and the communication data output from the robot communication interface 160 according to the program stored in the memory 172. In addition, the microprocessor 171 may generate control signals for controlling the driver 140, the cleaner 150, and the robot communication interface 160 according to the processing result of the motion information, the obstacle information, and the communication data. For example, the microprocessor 171 may generate a driving control signal to bypass or avoid the obstacle based on the obstacle information output from the robot obstacle detector 130.

The microprocessor 171 may generate a map representing the driving space based on the motion information output from the robot motion detector 120, and may store information about the map in the memory 172.

The microprocessor 171 may output the communication control signal for determining the position of the user terminal 200 and the indicating direction of the user terminal 200. The microprocessor 171 may generate information about the position of the user terminal 200 and information about the indicating direction of the user terminal 200 based on a result of communication with the user terminal 200 (a time difference between the detection signal and the response signal). In addition, the microprocessor 171 may determine the target position T indicated by the user terminal 200 based on the information about the position of the user terminal 200 and the information about the indicating direction of the user terminal 200.

The microprocessor 171 may generate the driving control signal to move the mobile robot 100 to the target position T.

The microprocessor 171 may include an arithmetic circuit for performing logical and arithmetic operations, a memory circuit for storing the calculated data, and a control circuit for controlling the arithmetic circuit in the memory circuit.

As described above, the mobile robot 100 may determine the position of the user terminal 200 and the indicating direction of the user terminal 200, and may determine the target position T indicated by the user terminal 200 based on the position of the user terminal 200 and the indicating direction of the user terminal 200. In addition, the mobile robot 100 may move toward the target position T indicated by the user terminal 200.

Figure 8:
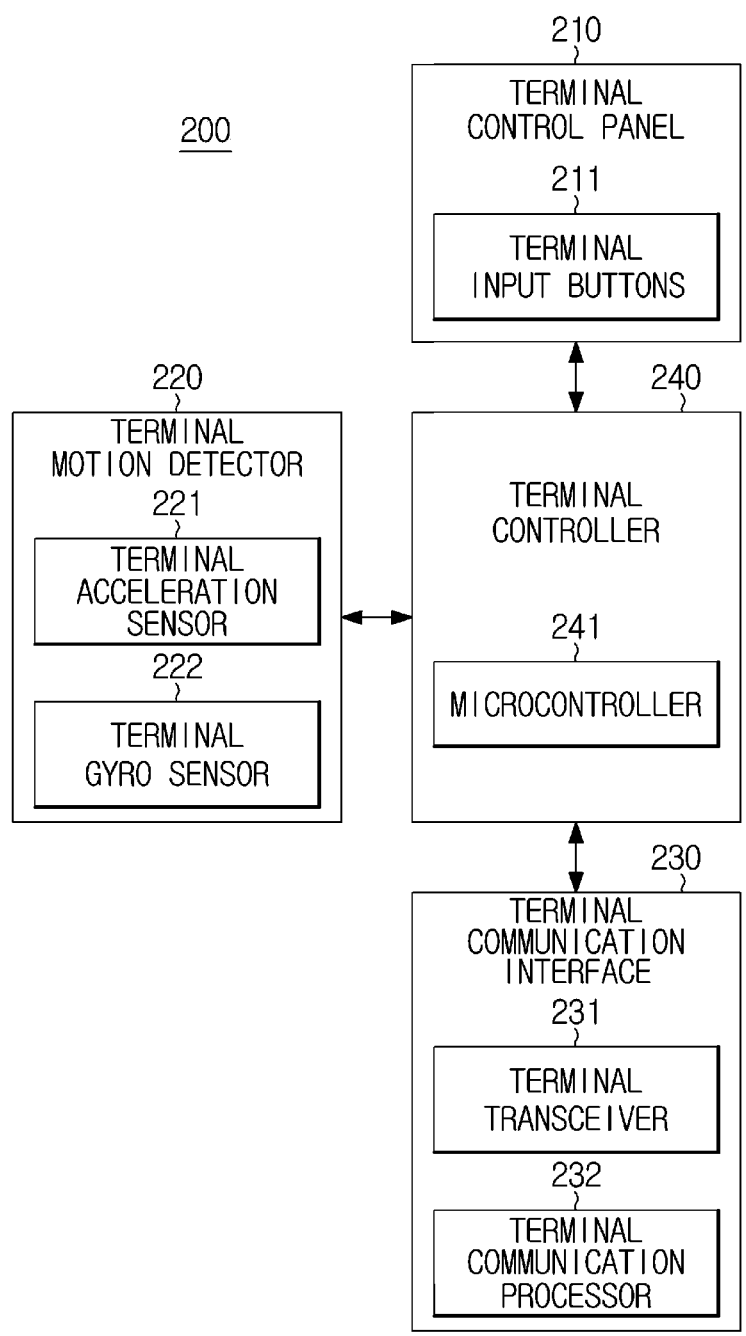
FIG. 8 is a block diagram of a user terminal according to an embodiment.
Figure 9:
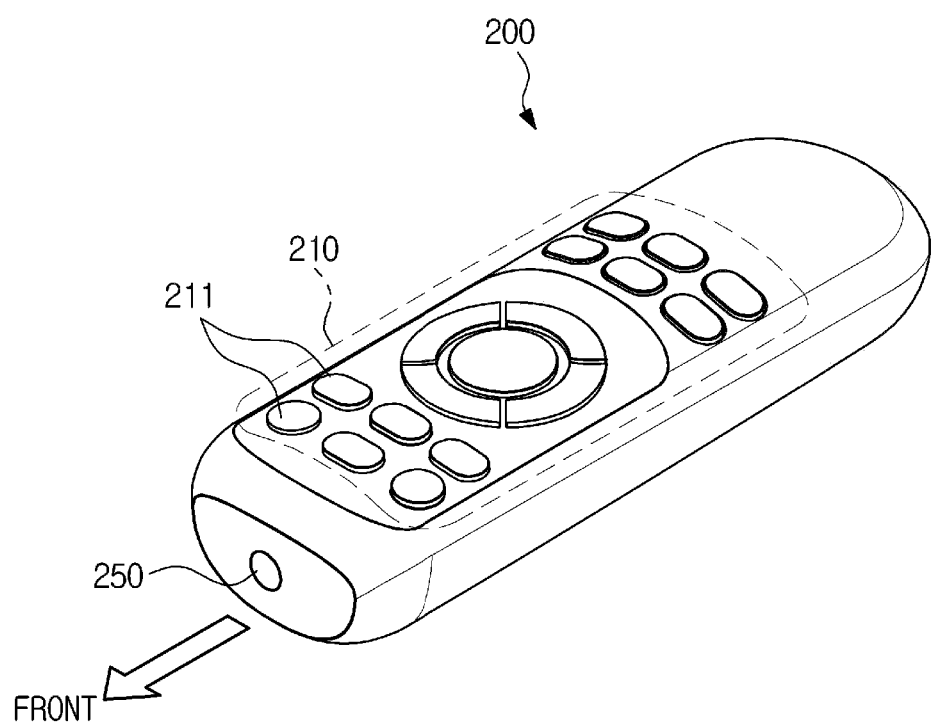
FIG. 9 is a view illustrating an appearance of a user terminal according to an embodiment.
Figure 10:
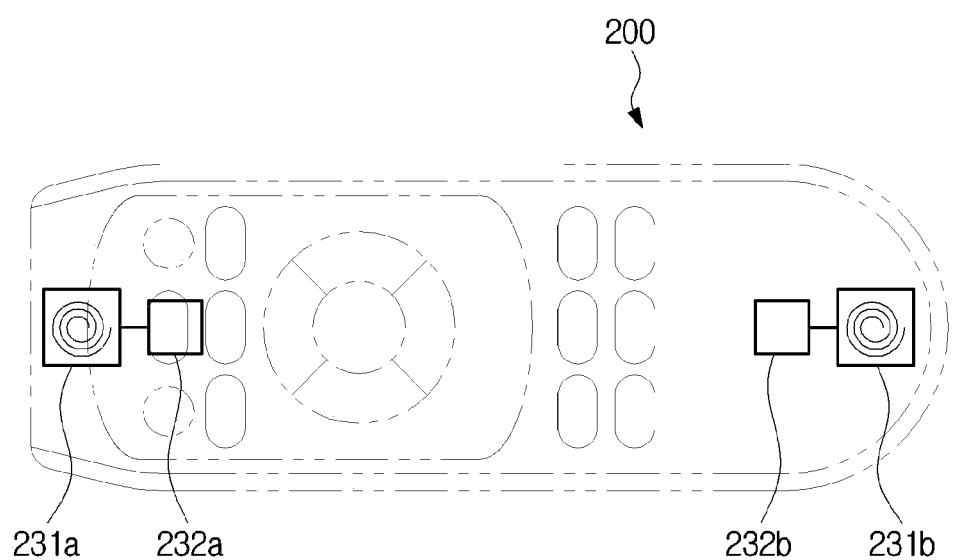
FIG. 10 is a view illustrating an example of a terminal communication interface included in a user terminal according to an embodiment.
Figure 11:
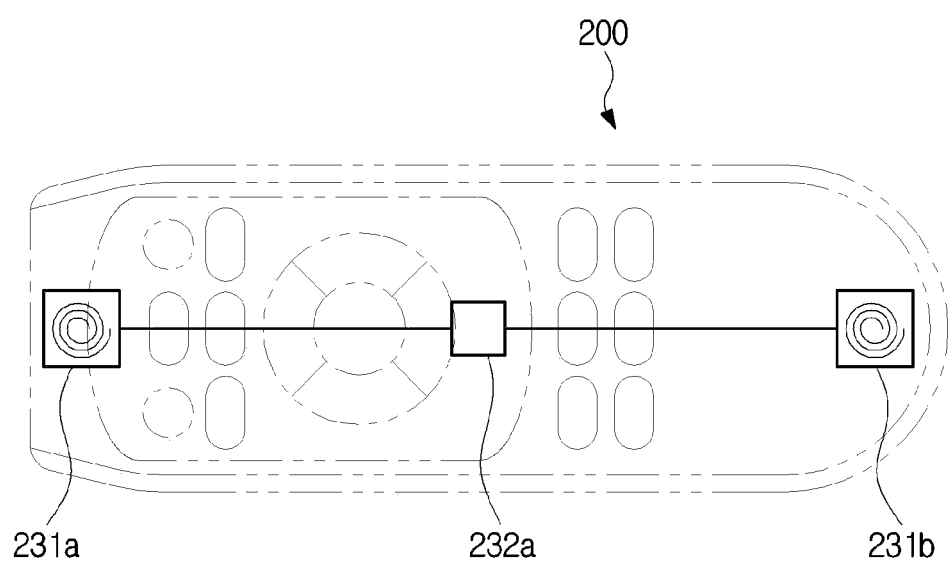
FIG. 11 is a view illustrating another example of a terminal communication interface included in a user terminal according to an embodiment.

FIG. 8 is a block diagram of a user terminal according to an embodiment. FIG. 9 is a view illustrating an appearance of a user terminal according to an embodiment. FIG. 10 is a view illustrating an example of a terminal communication interface included in a user terminal according to an embodiment. FIG. 11 is a view illustrating another example of a terminal communication interface included in a user terminal according to an embodiment.

Referring to FIGS. 8, 9, 10, and 11, the user terminal 200 may include a terminal body 201, and the terminal body 201 may accommodate the components constituting the user terminal 200 and protect the components from the external forces.

Interior and exterior parts of the terminal body 201 may include a terminal control panel 210 for interacting with the user U, a terminal motion detector for detecting movement of the user terminal 200, a distance detector 250 for detecting a distance between the user terminal 200 and the target position T, a terminal communication interface 230 for communicating with the mobile robot 100, and a terminal controller 240 for controlling the operation of the user terminal 200. However, the configuration of the user terminal 200 is not limited to that illustrated in FIG. 8, and other configurations may be added or the parts thereof may be omitted as necessary.

The terminal control panel 210 may be disposed at a top surface of the terminal body 201, and may include a plurality of terminal input buttons 211 for receiving the control command from the user U.

The terminal input buttons 211 may include a plurality of the buttons for receiving various user inputs related to the operation of the mobile robot 100. For example, the terminal input buttons 211 may include the power button of the mobile robot 100, the operation button the mobile robot 100, the return button of the mobile robot 100, and a move button for moving the mobile robot 100 to the target position T.

Each of the plurality of buttons included in the terminal input buttons 211 may receive the user input and output the user control signal corresponding to the user input to the robot controller 170. In addition, each of the plurality of buttons included in the terminal input buttons 211 may be implemented by various input devices such as a push switch, a touch switch, a dial, a slide switch, a toggle switch, and the like.

The terminal motion detector 220 may detect the movement and the posture of the user terminal 200 when the user U indicates the target position T using the user terminal 200. For example, the terminal motion detector 220 may include linear moving acceleration, a linear moving speed, a linear moving displacement, a linear moving direction, tilting, a rotational moving angular velocity, a rotational moving angular displacement and/or rotational direction (axial direction of rotational movement), etc. of the user terminal 200.

The terminal motion detector 220 may include a terminal acceleration sensor 221 for detecting the linear movement of the user terminal 200 and a terminal gyro sensor 222 for detecting the rotational movement of the user terminal 200.

The terminal acceleration sensor 221 may measure x-axis acceleration, y-axis acceleration, and/or z-axis acceleration (three-axis linear acceleration) due to the linear movement of the user terminal 200. For example, the terminal acceleration sensor 221 may measure the linear moving acceleration of the user terminal 200 based on the acceleration (gravity acceleration) caused by the earth's gravity. In addition, the terminal acceleration sensor 221 may determine the posture of the user terminal 200 based on the change in the direction of the gravity acceleration.

The terminal gyro sensor 222 may measure the angular velocity (rotational speed) of the center of the x-axis, the angular velocity of the center of the y-axis, and/or the angular velocity of the center of the z-axis (three-axis angular velocity) by the rotational movement of the user terminal 200. In addition, the terminal gyro sensor 222 may calculate the rotational moving displacement of the user terminal 200 from the rotational moving angular velocity of the mobile robot 100.

As such, the terminal motion detector 220 may output information about the movement such as the linear moving acceleration, the linear moving speed, the linear moving displacement, the linear moving direction, the rotational moving angular velocity, the rotational moving angular displacement and/or the rotational direction (axial direction of rotational movement) of the user terminal 200 and information about the posture such as the tilting of the user terminal 200 to the terminal controller 240.

The distance detector 250 may detect the distance between the user terminal 200 and the target position T.

The distance detector 250 may include a transmitter 251 for transmitting a detecting medium (e.g., light or ultrasonic waves or radio waves) toward the direction indicated by the user terminal 200 and a receiver 252 for receiving the detecting medium reflected from a bottom surface.

The transmitter 251 may include an LED for transmitting light or an ultrasonic speaker for transmitting ultrasonic waves or an antenna for transmitting radio waves. The transmitter 251 may transmit light or ultrasonic waves or radio waves in the direction indicated by the user terminal 200.

When the detecting medium transmitted from the transmitter 251 reaches the bottom surface, the detecting medium may be reflected from the bottom surface. In addition, the position of the bottom surface reached by the detecting medium may be the target position T.

The receiver 252 may receive the light or the ultrasonic waves or the radio waves reflected from the bottom surface.

The distance detector 250 may determine a distance between the user terminal 200 and the target position at which the detecting medium is reflected from the strength of the detecting medium detected by the receiver 252 and/or the time difference between the transmission and reception of the detecting medium.

As such, the distance detector 250 may output the information about the distance between the user terminal 200 and the target position T to the terminal controller 240.

The terminal communication interface 230 may exchange the communication data with the mobile robot 100. The communication data may be transmitted by various media. For example, the communication data may be transmitted through light or ultrasonic waves or radio waves.

In the following, it is assumed that the communication data is transmitted through radio waves for better understanding. In particular, the terminal communication interface 230 may exchange the communication data with the mobile robot 100 using the UWB communication method.

The terminal communication interface 230 may include a terminal transceiver 231 for transmitting and receiving the UWB wireless signal, and a terminal communication processor 232 for generating the UWB wireless signal to be transmitted and processing the received UWB wireless signal.

The terminal communication processor 232 may receive the UWB wireless signal from a free space or transmit the UWB wireless signal to the free space, and may include the antenna and the amplifier.

The terminal communication processor 232 may generate the UWB wireless signal according to the communication control signal of the terminal controller 240 and process the UWB wireless signal received by the terminal transceiver 231.

The terminal communication interface 230 may include one or more of the terminal transceivers 231 and one or more of the terminal communication processors 232.

For example, as illustrated in FIG. 10, the terminal communication interface 230 may include two of the terminal transceivers 231 and two of the terminal communication processors 232.

The terminal communication interface 230 may include a first terminal transceiver 231a and a second terminal transceiver 231b. The first terminal transceiver 231a and the second terminal transceiver 231b may be disposed in the longitudinal direction on the user terminal 200. In other words, when the first terminal transceiver 231a and the second terminal transceiver 231b are connected, a virtual straight line is formed, and the direction indicated by the virtual straight line may be the same as the direction indicated by the user terminal 200.

The terminal communication interface 230 may further include a first terminal communication processor 232a, and a second terminal communication processor 232b. The first terminal communication processor 232a and the second terminal communication processor 232b may be installed at positions adjacent to the first terminal transceiver 231a and the second terminal transceiver 231b, respectively.

The first terminal communication processor 232a may process the UWB wireless signal transmitted and received through the first terminal transceiver 231a, and the second terminal communication processor 232b may process the UWB wireless signal transmitted and received through the second terminal transceiver 231b.

As another example, as illustrated in FIG. 11, the terminal communication interface 230 may include two of the terminal transceivers 231 and one of the terminal communication processors 232.

The terminal communication interface 230 may include the first terminal transceiver 231a and the second terminal transceiver 231b. The first terminal transceiver 231a and the second terminal transceiver 231b may be disposed in the longitudinal direction on the user terminal 200. In other words, when the first terminal transceiver 231a and the second terminal transceiver 231b are connected, the virtual straight line is formed, and the direction indicated by the virtual straight line may be the same as the direction indicated by the user terminal 200. In addition, the terminal communication interface 230 may further include the first terminal communication processor 232a, and the first terminal communication processor 232a may be installed at any position.

The first terminal communication processor 232a may alternately process the UWB wireless signal transmitted and received through the first terminal transceiver 231a and the UWB wireless signal transmitted and received through the second terminal transceiver 231b.

The terminal communication interface 230 may exchange communication data with the mobile robot 100 using the UWB communication method. The terminal communication interface 230 may exchange the UWB wireless signal with the mobile robot 100 to measure the distance between the mobile robot 100 and the terminal transceiver 231.

For example, the user terminal 200 may receive the detection signal of the mobile robot 100 through the terminal transceiver 231 and transmit a response signal to the mobile robot 100 in response to receiving the detection signal.

Particularly, the user terminal 200 may receive the detection signal of the mobile robot 100 through the first terminal transceiver 231a and then transmit the response signal to the mobile robot 100 through the first terminal transceiver 231a. In addition, the user terminal 200 may receive the detection signal of the mobile robot 100 through the second terminal transceiver 231b and then transmit the response signal to the mobile robot 100 through the second terminal transceiver 231b.

The mobile robot 100 may determine the distance between the first terminal transceiver 231a and the robot transceiver 161 and the distance between the second terminal transceiver 231b and the robot transceiver 161 based on the time difference between the transmission of the detection signal and the reception of the response signal. The mobile robot 100 may determine the position of the first terminal transceiver 231a based on the distances between the first terminal transceiver 231a and the robot transceivers 161a, 161b, and 161c. The mobile robot 100 may determine the position of the second terminal transceiver 231b based on the distances between the second terminal transceiver 231b and the robot transceivers 161a, 161b, and 161c. In addition, the mobile robot 100 may determine the indicating direction of the user terminal 200 based on the position of the first terminal transceiver 231a and the position of the second terminal transceiver 231b.

The terminal controller 240 may process the user input of the terminal control panel 210 and output a communication control signal and/or communication data to the terminal communication interface 230.

The terminal controller 240 may transmit a target position movement command to the mobile robot 100 through the terminal communication interface 230 in response to receiving the target position movement command of the user. In addition, the terminal controller 240 may control the terminal communication interface 230 so that the terminal communication interface 230 transmits the response signal in response to the detection signal of the mobile robot 100.

The terminal controller 240 may include a microcontroller 241.

The microcontroller 241 may process the user input according to the program stored therein and generate the communication control signal and/or the communication data corresponding to the user input. For example, in response to the user's target position movement command, the microcontroller 241 may output the communication control signal that causes the mobile robot 100 to determine the position of the user terminal 200 and the indicating direction of the user terminal 200.

The microcontroller 241 may include an arithmetic circuit for performing logical and arithmetic operations, a memory circuit for storing the calculated data, and a control circuit for controlling the arithmetic circuit in the memory circuit.

As described above, the user terminal 200 may receive the user input, and may communicate with the mobile robot 100 so that the mobile robot 100 can determine the position of the user terminal 200 and the indicating direction of the user terminal 200.

Hereinafter, operations of the mobile robot 100 and the user terminal 200 will be described.

Figure 12:
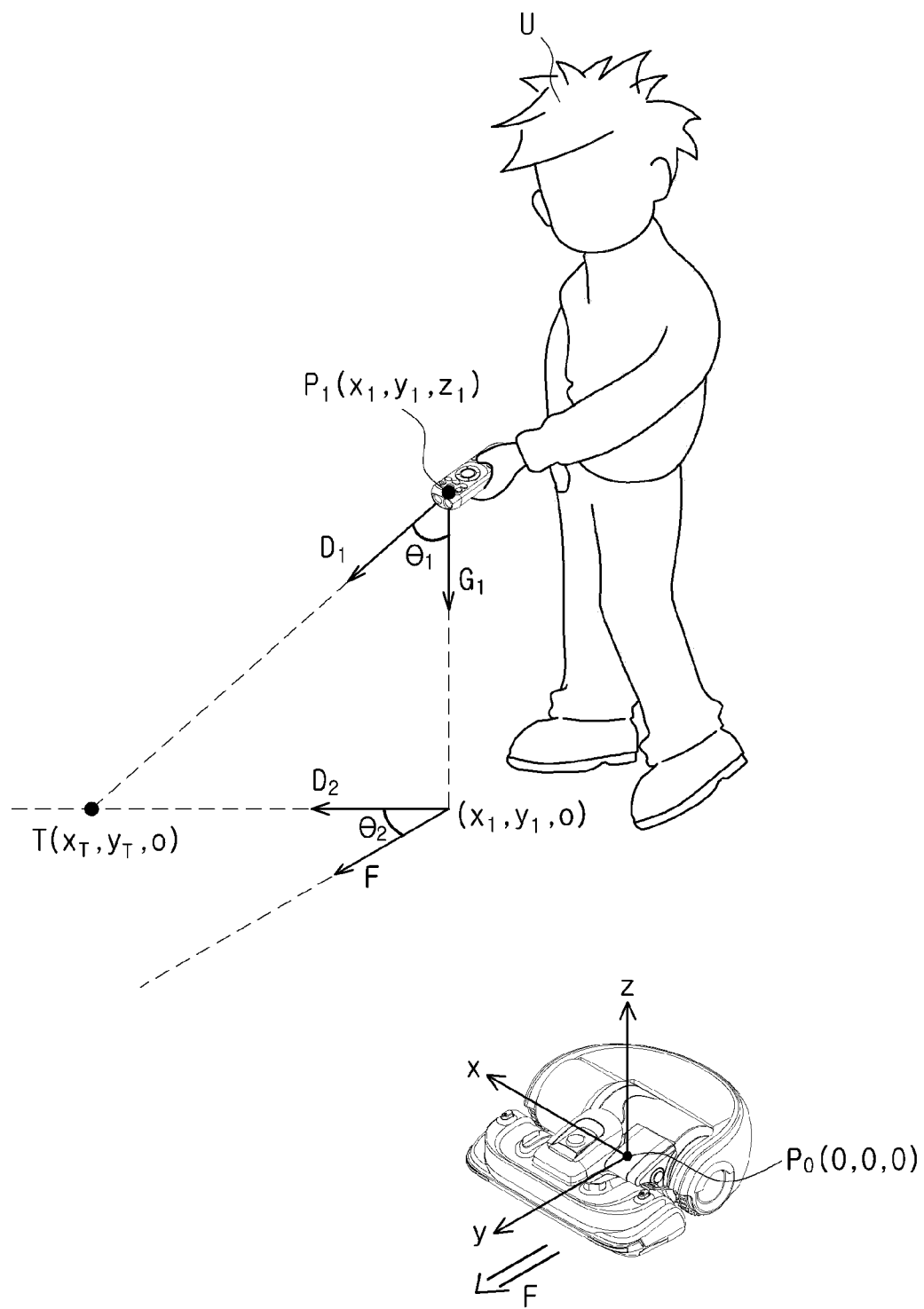
FIG. 12 is a view illustrating an example in which a mobile robot determines a target position according to an embodiment.

FIG. 12 is a view illustrating an example in which a mobile robot determines a target position according to an embodiment.

Referring to FIG. 12, a method of determining the target position T indicated by the user terminal 200 by the mobile robot 100 will be described.

The user U may designate the target position T using the user terminal 200. For example, as illustrated in FIG. 12, the user U may hold the user terminal 200 so that the user terminal 200 indicates the target position T, and may press a movement button provided in the terminal control panel 210. When the movement button of the terminal control panel 210 is pressed, the target position movement command is input, and the user terminal 200 may transmit the target position movement command to the mobile robot 100.

In order to determine the target position T, the mobile robot 100 may determine a position P1 of the user terminal 200. In detail, the mobile robot 100 may determine a relative position of the user terminal 200 from the mobile robot 100.

The mobile robot 100 may set a relative coordinate system as illustrated in FIG. 12. The relative coordinate system of the mobile robot 100 may set a position P0 of the mobile robot 100 in an origin point (0, 0, 0), a front direction F of the mobile robot 100 in a +y-axis direction, a right direction of the mobile robot 100 in a +x-axis direction, and an upper side of the mobile robot 100 in a +z-axis direction.

The mobile robot 100 may determine coordinates (x1, y1, z1) of the user terminal 200 in the relative coordinate system of the mobile robot 100. For example, the mobile robot 100 may determine the coordinates (x1, y1, z1) of the user terminal 200 based on the distance between the robot transceivers 161*a*, 161*b*, and 161*c* and the user terminal 200 included in the mobile robot 100.

In addition, in order to determine the target position T, the mobile robot 100 may determine an indicating direction D1 of the user terminal 200 and a distance L1 between the target position T and the user terminal 200.

In order to determine the indicating direction D1 of the user terminal 200, the mobile robot 100 may determine a first angle θ1 between the indicating direction D1 of the user terminal 200 and a vertical direction G1. For example, the user terminal 200 may determine the first angle θ1 based on the output of the terminal motion detector 220 and transmit information about the first angle θ1 to the mobile robot 100.

In addition, the mobile robot 100 may determine a second angle θ2 between a direction D2 (hereinafter referred to as 'indicating direction on the bottom surface') in which the indicating direction D1 of the user terminal 200 is projected onto the bottom surface (xy plane) and the front direction F of the mobile robot 100. For example, the mobile robot 100 may determine the coordinates (x1, y1, z1) of the first terminal transceiver 231*a* of the user terminal 200 and coordinates (x2, y2, z2) of the second terminal transceiver 231*b*, and may determine the second angle θ2 based on the coordinates (x1, y1, z1) of the first terminal transceiver 231*a* and the coordinates (x2, y2, z2) of the second terminal transceiver 231*b*.

In addition, the user terminal 200 may determine the distance L1 between the target position T and the user terminal 200 based on the output of the distance detector 250, and may transmit the information about the distance L1 between the target position T and the user terminal 200 to the mobile robot 100.

The mobile robot 100 may determine coordinates (xT, yT, 0) of the target position T from the coordinates (x1, y1, z1) of the user terminal 200, the indicating direction (e.g., first and second angles), and the distance L1 between the target position T and the user terminal 200.

The x-axis coordinate xT and the y-axis coordinate yT of the target position T may be calculated by [Equation 1] and [Equation 2], respectively.

$$x_T = L_1 \sin \theta_1 \sin \theta_2 + x_1 \qquad \text{[Equation 1]}$$

$$y_T = L_1 \sin \theta_1 \cos \theta_2 + y_1 \qquad \text{[Equation 2]}$$

(Where xT is the x-axis coordinate of the target position, yT is the y-axis coordinate of the target position, x1 is the x-axis coordinate of the user terminal position, y1 is the y-axis coordinate of the user terminal position, L1 is the distance between the target position and the user terminal, θ1 is the first angle, and θ2 is the second angle.)

As described above, the mobile robot 100 may determine the target position T based on the position P1 of the user terminal 200 and the indicating directions D1 and D2 of the user terminal 200.

Hereinafter, a method of determining the target position of the mobile robot 100 will be described in more detail.

Figure 13:
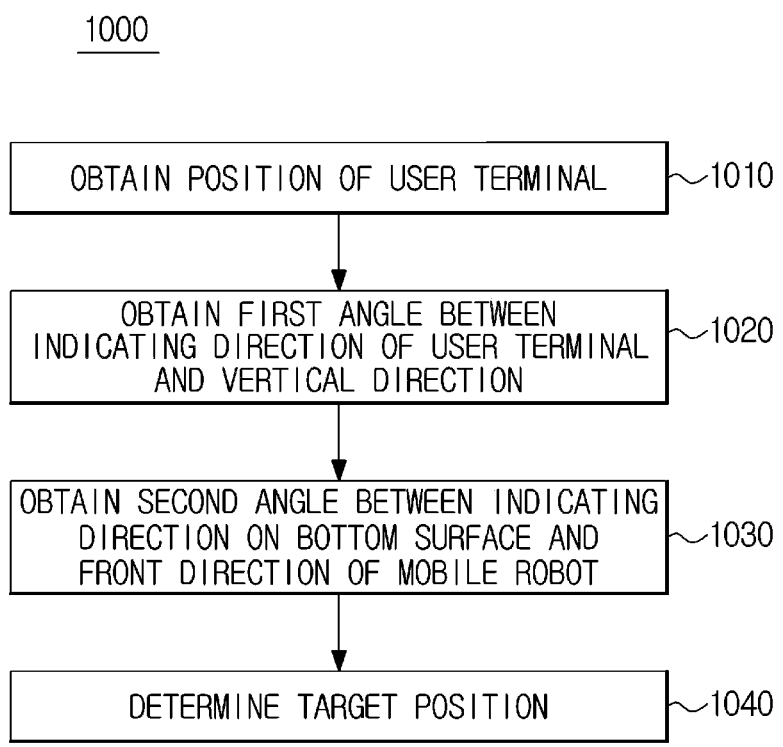
FIG. 13 is a view illustrating a method in which a mobile robot determines a target position according to an embodiment.
Figure 14:
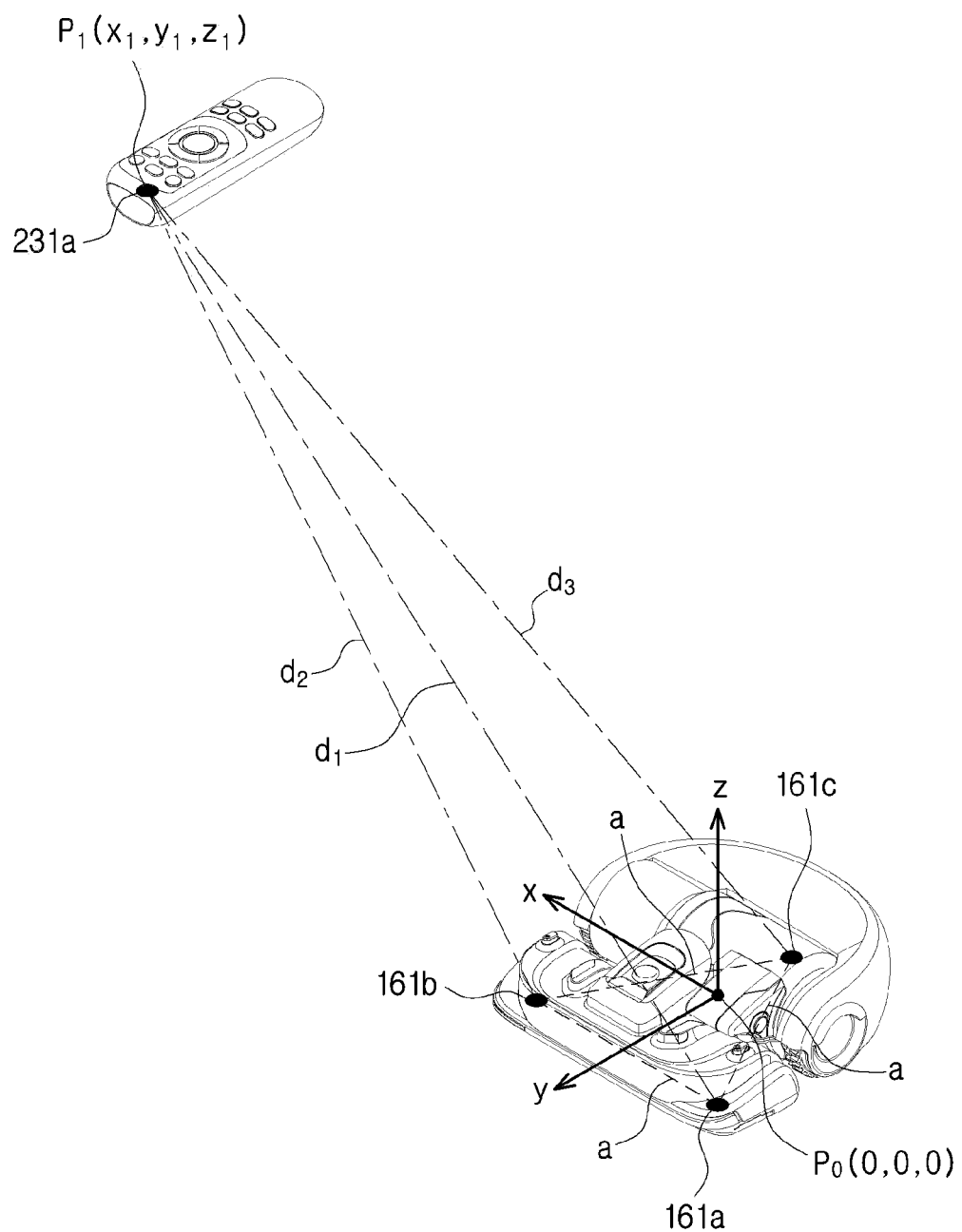
FIG. 14 is a view illustrating an example in which a mobile robot determines a position of a user terminal according to an embodiment.
Figure 16:
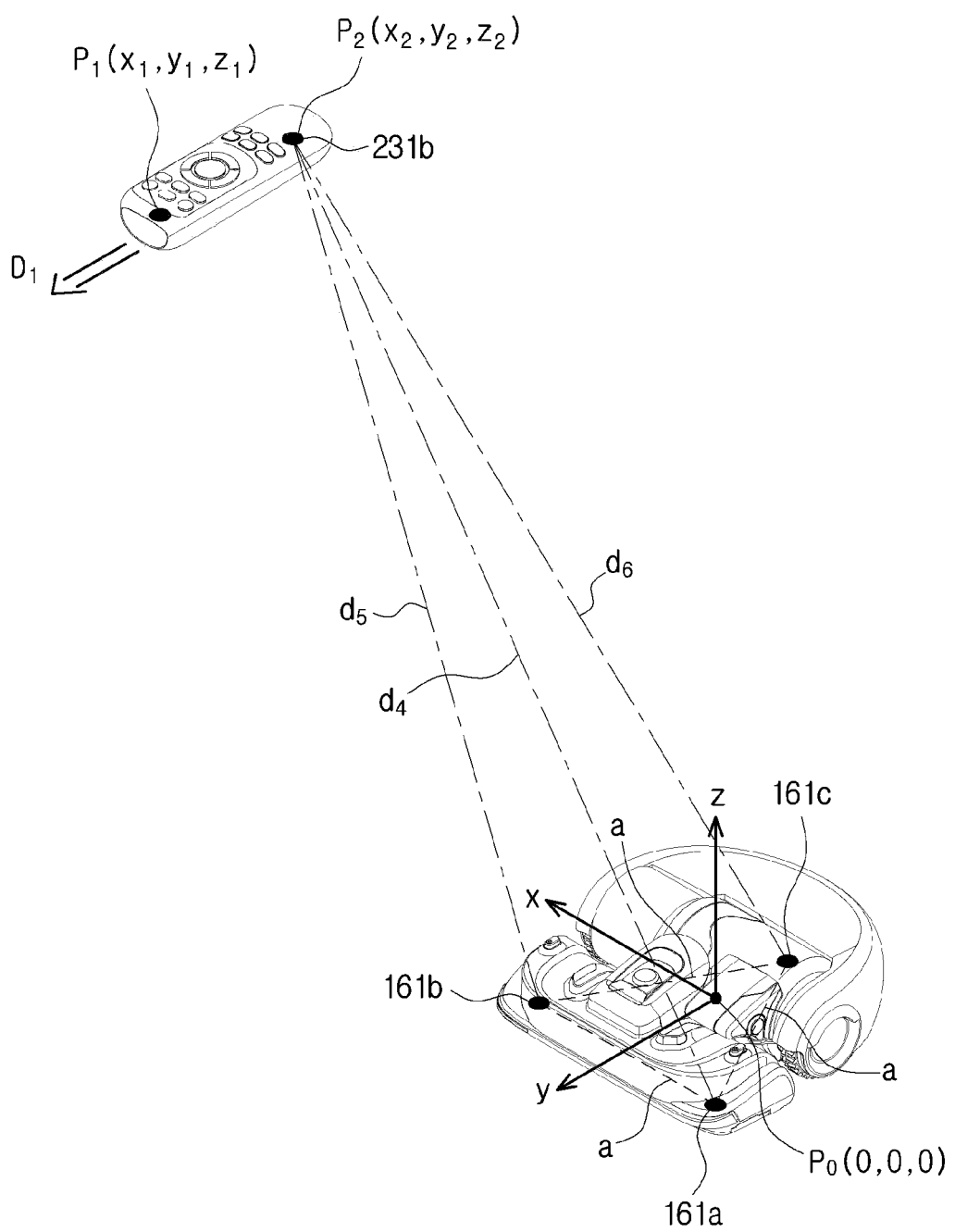
FIGS. 16 and 17 are views illustrating an example in which a mobile robot determines an indicating direction of a user terminal according to an embodiment.
Figure 17:
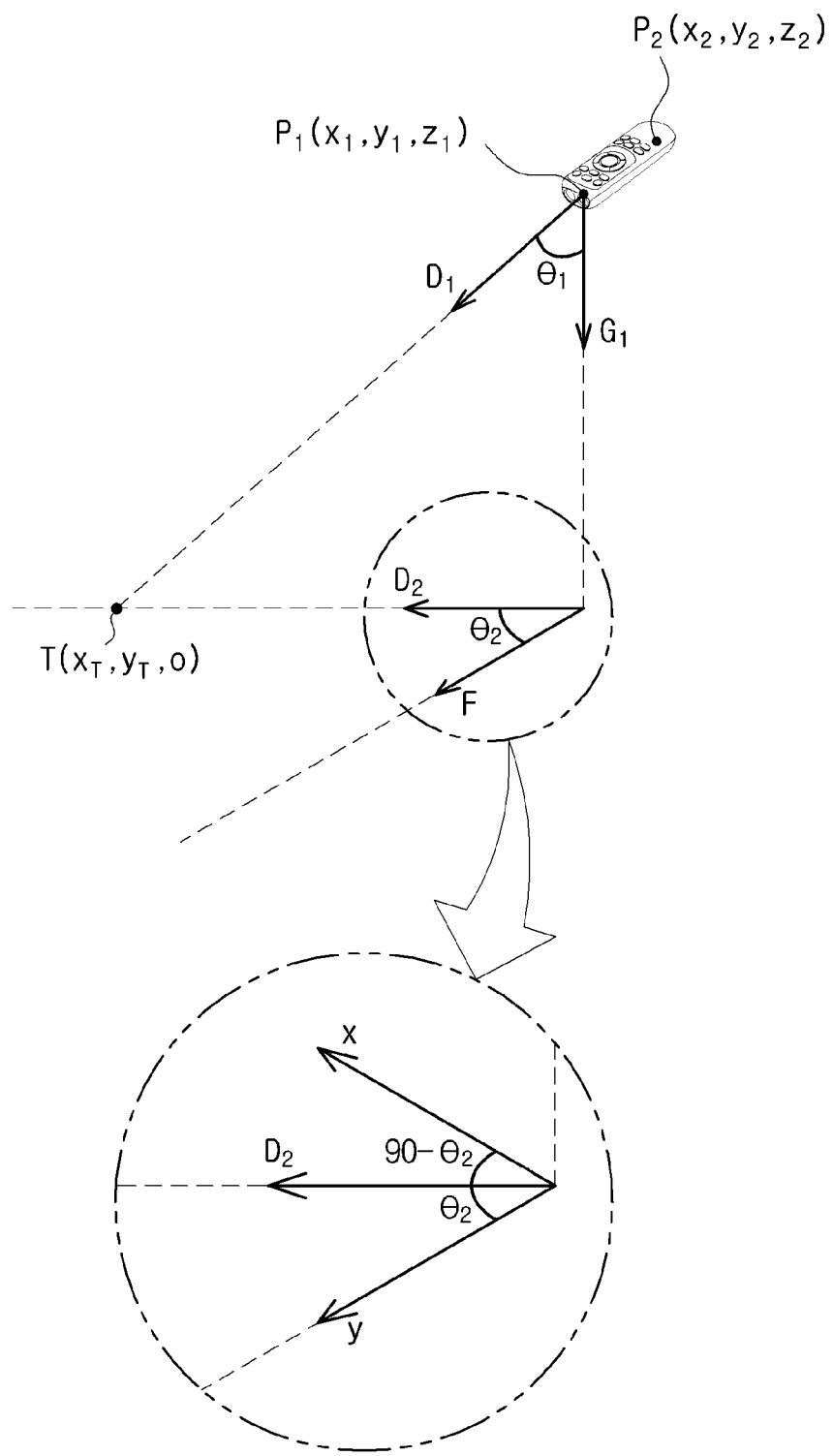

FIG. 13 is a view illustrating a method in which a mobile robot determines a target position according to an embodiment. FIG. 14 is a view illustrating an example in which a mobile robot determines a position of a user terminal according to an embodiment. FIG. 15 is a view illustrating another example in which a mobile robot determines a position of a user terminal according to an embodiment. FIGS. 16 and 17 are views illustrating an example in which a mobile robot determines an indicating direction of a user terminal according to an embodiment.

Referring to FIGS. 13, 14, 15, 16, and 17, a method 1000 for determining a target position of the mobile robot 100 is described.

The mobile robot 100 may obtain the position P1 of the user terminal 200 (1010).

The mobile robot 100 may determine the position P1 of the user terminal 200 using communication with the user terminal 200.

The mobile robot 100 may exchange the UWB wireless signals with the user terminal 200 through the robot transceiver 161, and may determine the distance between the robot transceiver 161 and the user terminal 200 based on the propagation time of the UWB wireless signal. In addition, the mobile robot 100 may determine the position P1 of the user terminal 200 based on the distance between the robot transceiver 161 and the user terminal 200.

For example, as illustrated in FIG. 14, the mobile robot 100 may include the first robot transceiver 161*a*, the second robot transceiver 161*b*, and the third robot transceiver 161*c*. The first robot transceiver 161*a*, the second robot transceiver 161*b*, and the third robot transceiver 161*c* may be spaced apart from each other by the predetermined distance a. In addition, the user terminal 200 may include the first terminal transceiver 231*a*, and the position P1 of the first terminal transceiver 231*a* may be assumed to be the position of the user terminal 200.

The mobile robot 100 may transmit the detection signal through the first robot transceiver 161*a*, and the user terminal 200 may receive the detection signal through the first terminal transceiver 231*a*. The user terminal 200 may transmit the response signal through the first terminal transceiver 231*a* in response to the detection signal, and the mobile robot 100 may receive the response signal through the first robot transceiver 161*a*. The mobile robot 100 may measure the response time interval between transmission of the detection signal and reception of the response signal. In addition, the mobile robot 100 may calculate the wireless signal propagation time by subtracting the detection signal processing time of the user terminal 200 from the response time interval, and the first terminal transceiver 231*a* of the user terminal 200 from the wireless signal propagation time, and may determine the first distance d1 between the first terminal transceiver 231*a* of the user terminal 200 and the first robot transceiver 161*a* from the wireless signal propagation time.

The mobile robot 100 may transmit the detection signal through the second robot transceiver 161*b*, and the user terminal 200 may transmit the response signal through the first terminal transceiver 231*a* in response to receiving the detection signal. The mobile robot 100 may receive the response signal through the second robot transceiver 161*b*. The mobile robot 100 may measure the response time interval between the transmission of the detection signal and the reception of the response signal, and may determine the second distance d2 between the first terminal transceiver 231*a* of the user terminal 200 and the second robot transceiver 161*b* based on the response time interval.

The mobile robot 100 may transmit the detection signal through the third robot transceiver 161*c*, and the user terminal 200 may transmit the response signal through the first terminal transceiver 231*a* in response to receiving the detection signal. The mobile robot 100 may receive the response signal through the third robot transceiver 161*c*. The mobile robot 100 may measure the response time interval between the transmission of the detection signal and the reception of the response signal, and may determine the second distance d2 between the first terminal transceiver 231*a* of the user terminal 200 and the third robot transceiver 161*c* based on the response time interval.

The mobile robot 100 may determine the coordinates (x1, y1, z1) (exactly, coordinates of the first terminal transceiver) of the user terminal 200 based on the first distance d1, the second distance d2, the third distance d3, the coordinates of the first terminal transceiver 231*a*, the coordinates of the second terminal transceiver 231*b*, and the coordinates of the third terminal transceiver 231*c*. In this case, the coordinates of the first terminal transceiver 231*a* may be $$\left(0, \frac{\sqrt{3}\,a}{3}, 0\right),$$

the coordinates of the second terminal transceiver 231*b* may be $$\left(\frac{a}{2}, -\frac{\sqrt{3}\,a}{6}, 0\right),$$

and the coordinates of the third terminal transceiver 231*c* may be $$\left(-\frac{a}{2}, -\frac{\sqrt{3}\,a}{6}, 0\right).$$

The coordinates (x1, y1, z1) of the user terminal 200 and the coordinates of the first terminal transceiver 231*a*, and the first distance d1 have a relationship of [Equation 3].

$$(x_1 - 0)^2 + \left(y_1 - \frac{\sqrt{3}\,a}{3}\right)^2 + (z_1 - 0)^2 - d_1^2 = 0 \quad \text{[Equation 3]}$$

(Where x1 is the x-axis coordinate of the user terminal, y1 is the y-axis coordinate of the user terminal, z1 is the z-axis coordinate of the user terminal, a is between the first terminal transceiver, the second terminal transceiver and the third terminal transceiver, and d1 is the first distance.)

The coordinates (x1, y1, z1) of the user terminal 200, the coordinates of the second terminal transceiver 231*b*, and the second distance d2 have a relationship of [Equation 4].

$$\left(x_1 - \frac{a}{2}\right)^2 + \left(y_1 - \frac{\sqrt{3}\,a}{6}\right)^2 + (z_1 - 0)^2 - d_2^2 = 0 \quad \text{[Equation 4]}$$

(Where x1 is the x-axis coordinate of the user terminal, y1 is the y-axis coordinate of the user terminal, z1 is the z-axis coordinate of the user terminal, a is between the terminal transceivers, and d2 is the second distance.)

The coordinates (x1, y1, z1) of the user terminal 200, the coordinates of the third terminal transceiver 231*c*, and the third distance d3 have a relationship of [Equation 5].

$$\left(x_1 + \frac{a}{2}\right)^2 + \left(y_1 - \frac{\sqrt{3}\,a}{6}\right)^2 + (z_1 - 0)^2 - d_3^2 = 0 \quad \text{[Equation 5]}$$

(Where x1 is the x-axis coordinate of the user terminal, y1 is the y-axis coordinate of the user terminal, z1 is the z-axis coordinate of the user terminal, a is between the terminal transceivers, and d3 is the third distance.)

The mobile robot 100 may calculate a simultaneous approximation solution (x1, y1, z1) of [Equation 3], [Equation 4] and [Equation 5] using the Gauss-Newton Method.

As another example, as illustrated in FIG. 15, the mobile robot 100 may include the first robot transceiver 161*a*.

The mobile robot 100 may turn in the same place to determine the coordinates (x1, y1, z1) of the user terminal 200, and may determine the coordinates of the first robot transceiver 161*a* and the distance between the user terminal 200 and the first robot transceiver 161*a* while turning in the same place.

Figure 15A:
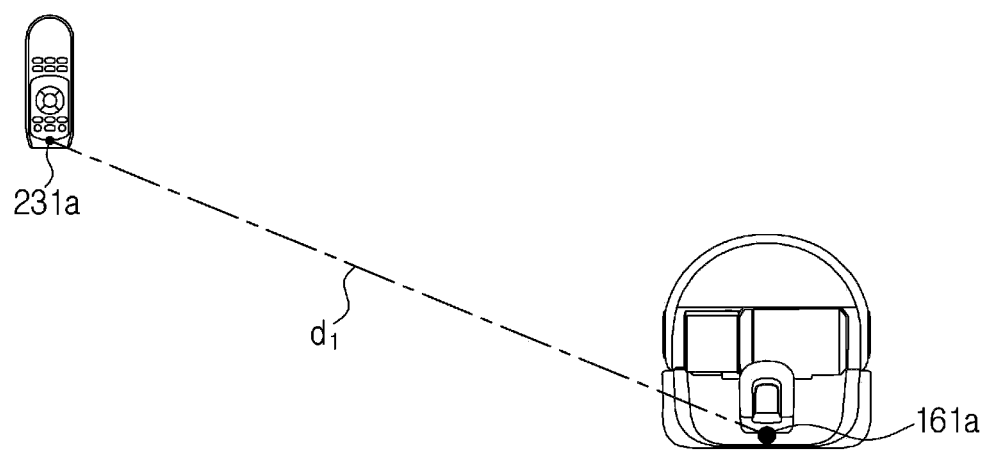
FIG. 15 is a view illustrating another example in which a mobile robot determines a position of a user terminal according to an embodiment.
Figure 15B:
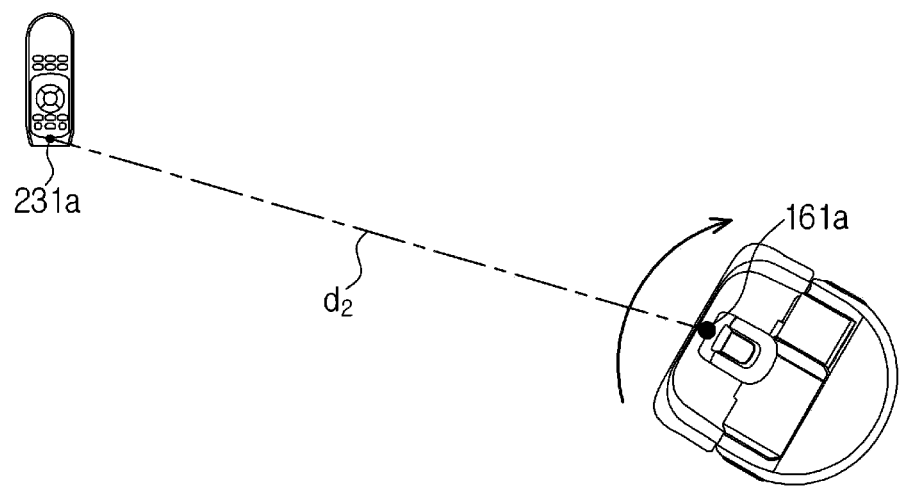
Figure 15C:
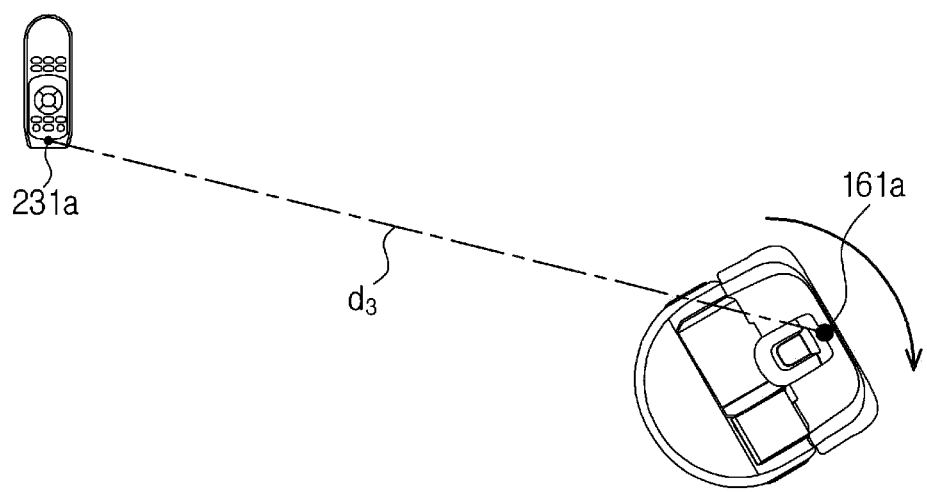

As illustrated in FIG. 15A, when the mobile robot 100 is turned 0 degrees in the same place, the mobile robot 100 may determine the first distance d1 between the user terminal 200 and the first robot transceiver 161*a* based on the response time interval. As illustrated in FIG. 15B, when the mobile robot 100 is turned 120 degrees in the same place, the mobile robot 100 may determine the second distance d2 between the user terminal 200 and the first robot transceiver 161*a* based on the response time interval. As illustrated in FIG. 15C, when the mobile robot 100 is turned 240 degrees in the same place, the mobile robot 100 may determine the third distance d3 between the user terminal 200 and the first robot transceiver 161*a* based on the response time interval.

The mobile robot 100 may determine the coordinates (x1, y1, z1) (exactly, coordinates of the first terminal transceiver) of the user terminal 200 using a triangulation method based on the first distance d1, the second distance d2, and the third distance d3.

The mobile robot 100 may calculate the simultaneous approximation solution (x1, y1, z1) of [Equation 3], [Equation 4] and [Equation 5] using the Gauss-Newton Method.

In order to determine the coordinates (x1, y1, z1) of the user terminal 200, the point at which the mobile robot 100 determines the distance between the user terminal 200 and the first robot transceiver 161*a* is not limited to three points. For example, the mobile robot 100 may determine the distance between the user terminal 200 and the first robot transceiver 161*a* at dozens of points while turning in the same place, and may obtain dozens of equations between the coordinates of the user terminal 200 and the coordinates of the first robot transceiver 161*a*. In addition, the mobile robot 100 may calculate a solution of dozens of simultaneous equations using the Gauss-Newton method.

As another example, the mobile robot 100 may include the first robot transceiver 161*a* and may move to determine the coordinates (x1, y1, z1) of the user terminal 200. While moving, the mobile robot 100 may determine the coordinates of the first robot transceiver 161*a* and the distance between the user terminal 200 and the first robot transceiver 161*a*, and obtain dozens of equations between the coordinates of the user terminal 200 and the coordinates of the first robot transceiver 161*a*. The mobile robot 100 may calculate dozens of simultaneous equations using the Gauss-Newton method.

Particularly, during the movement of the mobile robot 100, the coordinates of the mobile robot 100 and the direction in which the mobile robot 100 is directed (front direction an output value of the robot gyro sensor) may change. As the coordinates and the front direction of the mobile robot 100 change, coordinates (Xr, Yr, 0) of the first robot transceiver 161*a* may also change together. In addition, the distance d between the first robot transceiver 161*a* and the user terminal 200 may also change due to the movement of the mobile robot 100.

During the movement, the mobile robot 100 may measure coordinates ((Xr1, Yr2, 0), (Xr2, Yr2, 0), (Xr3, Yr3, 0) . . . ) of the first robot transceiver 161*a* and the distances d1, d2, d3, . . . between the first robot transceiver 161*a* and the user terminal 200. The coordinates (Xr1, Yr1, 0) of the first robot transceiver 161*a* at the first position, the first distance d1 between the first robot transceiver 161*a* and the user terminal 200, the coordinates (Xr2, Yr2, 0) of the first robot transceiver 161*a* at the second position, the second distance d2 between the first robot transceiver 161*a* and the user terminal 200, and the coordinates (Xr3, Yr3, 0) of the first robot transceiver 161*a* at the third position, the third distance d3 between the first robot transceiver 161*a* and the user terminal 200 may be measured.

Further, the mobile robot 100 may measure the coordinates ((Xr1, Yr2, 0), (Xr2, Yr2, 0), (Xr3, Yr3, 0) . . . ) of the first robot transceiver 161*a* and the distances d1, d2, d3, . . . between the first robot transceiver 161*a* and the user terminal 200 using a relationship of [Equation 6].

$(x_1-Xr1)^2+(y_1-Yr1)^2-d_1^2=0.$ $(x_1-Xr2)^2+(y_1-Yr2)^2-d_2^2=0.$ $(x_1-Xr3)^2+(y_1-Yr3)^2-d_3^2=0$ [Equation 6]

(Where x1 is the x-axis coordinate of the user terminal, y1 is the y-axis coordinate of the user terminal, Xr1 is the x-axis coordinate of the first robot transceiver at the first position, Yr1 is the y-axis coordinate of the first robot transceiver at the first position, d1 is the first distance between the first robot transceiver and the user terminal at the first position; Xr2 is the x-axis coordinate of the first robot transceiver at the second position, Yr2 is the y-axis coordinate of the first robot transceiver at the second position, d2 is the second distance between the first robot transceiver and the user terminal at the second position, Xr3 is the x-axis coordinate of the first robot transceiver at the third position, Yr3 is the y-axis coordinate of the first robot transceiver at the third position, and d3 is the third distance between the first robot transceiver and the user terminal at the third position.)

The mobile robot 100 may calculate the simultaneous approximation solution (x1, y1, 0) of [Equation 6] using the Gauss-Newton method. [Equation 6] describes three simultaneous equations, but the present disclosure is not limited thereto, and several to hundreds of simultaneous equations may be obtained.

In addition, the z-axis coordinate z1 of the user terminal 200 may be calculated from the coordinates ((Xr1, Yr2, 0), (Xr2, Yr2, 0), (Xr3, Yr3) . . . ) of the first robot transceiver 161*a* and the distances d1, d2, d3, . . . between the first robot transceiver 161*a* and the user terminal 200, or may be calculated from the distance L1 between the target position T detected by the distance detector 250 of the user terminal 200.

In addition, the mobile robot 100 may obtain the first angle θ1 between the indicating direction D1 of the user terminal 200 and the vertical direction G1 (1020).

The user terminal 200 may determine the posture of the user terminal 200 using the terminal acceleration sensor 221. The terminal acceleration sensor 221 may determine the linear moving acceleration of the user terminal 200 and/or the posture of the user terminal 200 based on the acceleration due to the earth's gravity (gravity acceleration). For example, the terminal acceleration sensor 221 may determine the posture of the user terminal 200 based on the change in the direction of the gravity acceleration.

The user terminal 200 may determine the tilting of the user terminal 200 from the output of the terminal acceleration sensor 221, that is, the first angle θ1 between the indicating direction D1 and the vertical direction G1 of the user terminal 200. In addition, the user terminal 200 may transmit information about the first angle θ1 to the mobile robot 100 through the terminal communication interface 230.

The mobile robot 100 may receive information about the first angle θ1 through the robot communication interface 160, and may obtain the first angle θ1 from the information about the first angle θ1.

In addition, the mobile robot 100 may obtain the second angle θ2 between the indicating direction D2 on the bottom surface and the front direction F of the mobile robot 100 (1030).

In order to obtain the second angle θ2, the mobile robot 100 may determine an indicator line indicating the direction indicated by the user terminal 200. In addition, to determine the indicator line, the mobile robot 100 may determine the positions of the first terminal transceiver 231*a* and the second terminal transceiver 231*b* located on the indicator line of the user terminal 200.

The position P1 of the first terminal transceiver 231*a* may be calculated to determine the coordinates (x1, y1, z1) of the user terminal 200 in operation 1010. Accordingly, the position of the first terminal transceiver 231*a* may be the same as the coordinates (x1, y1, z1) of the user terminal 200.

The mobile robot 100 may determine the position P2 of the second terminal transceiver 231*b* through communication with the user terminal 200.

For example, the mobile robot 100 may transmit the detection signal through the robot transceiver 161, and the user terminal 200 may receive the detection signal through the second terminal transceiver 231*b*. The user terminal 200 may transmit the response signal through the second terminal transceiver 231*b* in response to the detection signal, and the mobile robot 100 may receive the response signal through the robot transceiver 161.

The mobile robot 100 may measure the response e interval between the transmission of the detection signal and the reception of the response signal, and may determine a fourth distance d4, a fifth distance d5, and a sixth distance d6 as illustrated in FIG. 16.

The mobile robot 100 may determine the coordinates (x2, y2, z2) of the second terminal transceiver 231*b* using the triangulation method based on the fourth distance d4, the fifth distance d5, and the sixth distance d6.

As illustrated in FIG. 17, the mobile robot 100 may calculate the indicator line of the user terminal 200 on the bottom surface (xy plane) based on the xy coordinates (x1, y1) of the first terminal transceiver 231*a* and the xy coordinates (x2, y2) of the second terminal transceiver 231*b*, and calculate the second angle θ2 between the indicating direction D2 on the bottom surface and the front direction F of the mobile robot 100 on the basis of the inclination of the indicator line.

The mobile robot 100 may calculate the second angle θ2 using [Equation 7].

$$\theta_2 = 90° - \tan^{-1}\frac{y_2 - y_1}{x_2 - x_1} \quad \text{[Equation 7]}$$

(Where θ2 is the second angle, x1 is the x-axis coordinate of the first terminal transceiver, y1 is the y-axis coordinate of the first terminal transceiver, x2 is the x-axis coordinate of the second terminal transceiver, and y2 is the y-axis coordinate of the second terminal transceiver.)

The mobile robot 100 may determine the target position T indicated by the user terminal 200 (1040).

The mobile robot 100 may determine the coordinates (xT, yT, 0) of the target position T based on the coordinates (x1, y1, z1) of the user terminal 200, the first angle θ1 between the indicating direction D1 of the user terminal 200 and the vertical direction G1, and the second angle θ2 between the indicating direction D2 on the bottom surface and the front direction F of the mobile robot 100. For example, the x-axis coordinate xT and the y-axis coordinate yT of the target position T may be calculated by [Equation 1] and [Equation 2] described above, respectively.

After determining the target position T, the mobile robot 100 may move toward the target position T.

As described above, the mobile robot 100 may determine the position P1 of the user terminal 200 and the indicating directions D1 and D2 of the user terminal 200 through communication with the user terminal 200, and may determine the target position T based on the position P1 of the user terminal 200 and the indicating direction D1 of the user terminal 200.

The mobile robot 100 may include three or one of the robot transceivers 161. When the mobile robot 100 includes the first robot transceiver 161*a*, the second robot transceiver 161*b*, and the third robot transceiver 161*c*, the mobile robot 100 may determine the position P1 of the user terminal 200 based on the distance between each of the first robot transceiver 161*a*, the second robot transceiver 161*b*, and the third robot transceiver 161*c* and the user terminal 200. In addition, when the mobile robot 100 includes the first robot transceiver 161*a*, the mobile robot 100 may determine the position P1 of the user terminal 200 based on the distance between the first robot transceiver 161*a* and the user terminal 200 during turning in the same place or movement.

In addition, the user terminal 200 may include the first terminal transceiver 231*a* and the second terminal transceiver 231*b* that can exchange the data with the mobile robot 100, and the mobile robot may determine the indicating directions D1 and D2 of the user terminal 200 based on the position P1 of the first terminal transceiver 231*a* and the position P2 of the second terminal transceiver 231*b*.

Figure 18:
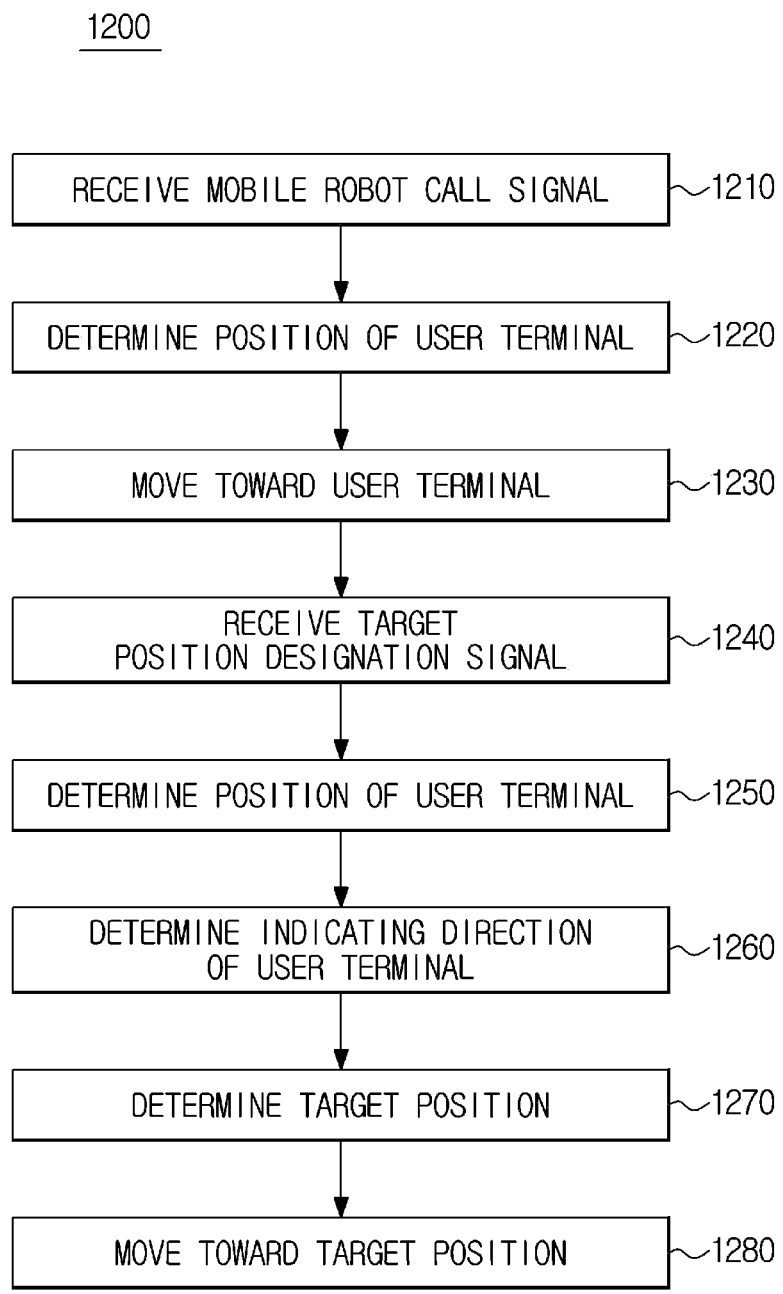
FIG. 18 is a view illustrating a method of moving a mobile robot to a target position according to an embodiment.

FIG. 18 is a view illustrating a method of moving a mobile robot to a target position according to an embodiment.

FIG. 18 describes a target position moving method 1200 of the mobile robot 100.

The mobile robot 100 may receive a mobile robot call signal from the user terminal 200 (1210).

The user U may call the mobile robot 100 using the user terminal 200 before designating the target position T. For example, when the obstacle is located between the mobile robot 100 and the user terminal 200, it is difficult for the mobile robot 100 to determine the correct target position T.

Therefore, before the target position T is designated, the user U may call the mobile robot 100 using the user terminal 200 so that the mobile robot 100 can move to a position close to the user terminal 200, and the mobile robot 100 may receive a call signal.

The mobile robot 100 may determine the position of the user terminal 200 (1220).

The mobile robot 100 may determine the position of the user terminal 200 using communication with the user terminal 200. For example, the mobile robot 100 may exchange the UWB wireless signal with the user terminal 200 through the robot transceiver 161, and may determine the distance between the robot transceiver 161 and the user terminal 200 based on the propagation time of the UWB wireless signal. In addition, the mobile robot 100 may determine the position of the user terminal 200 based on the distance between the robot transceiver 161 and the user terminal 200.

However, when the obstacle is located between the mobile robot 100 and the user terminal 200, although the mobile robot 100 has difficulty in determining the exact position of the user terminal 200, the user terminal 200 may determine the direction in which the user terminal 200 is located.

The mobile robot 100 may move toward the user terminal 200 (1230).

The mobile robot 100 may control the driver 140 to move toward the position of the user terminal 200 or the direction of the user terminal 200. In addition, when the obstacle (for example, a wall or furniture) is detected while moving toward the user terminal 200, the mobile robot 100 may avoid the obstacle or may drive along an outer line of the obstacle.

The mobile robot 100 may generate the path from the mobile robot 100 to the position of the user terminal 200 based on the map representing the driving space, and may move toward the user terminal 200 along the generated path.

In addition, the mobile robot 100 may periodically update the position of the user terminal 200 while moving toward the user terminal 200, and may move toward the updated user terminal 200.

In particular, the mobile robot 100 may determine the distance between the mobile robot 100 and the user terminal 200 while moving toward the user terminal 200. As the mobile robot 100 approaches the user terminal 200, the amount of distance data between the mobile robot 100 and the user terminal 200 increases. In addition, as the amount of distance data between the mobile robot 100 and the user terminal 200 increases, the mobile robot 100 may determine a more accurate position of the user terminal 200. Particularly, the mobile robot 100 may obtain at least dozens of pieces of data such as the distance between the robot transceiver and the user terminal 200 mounted on the mobile robot 100 and the mobile robot 100 while its position value changes during the movement. After expressing the system of equations of dozens of circles, the solution of the system of equations (i.e., the coordinates of the user terminal 200) may be calculated using the Gauss-Newton method.

The mobile robot 100 may receive the target position designation signal from the user terminal 200 (1240).

The user U may input the user input for designating the target position T using the user terminal 200 when the position of the mobile robot 100 is identified or the mobile robot 100 is close to the user terminal 200.

The user terminal 200 may transmit the target position designation signal to the mobile robot 100 in response to the user input for designating the target position T.

The mobile robot 100 may determine the position P1 of the user terminal 200 (1250).

The mobile robot 100 may determine the position P1 of the user terminal 200 using communication with the user terminal 200.

The method of determining the position P1 of the user terminal 200 may be the same as operation 1010 illustrated in FIG. 13.

The mobile robot 100 may determine the indicating direction D1 of the user terminal 200 (1260).

The mobile robot 100 may determine the first angle θ1 between the indicating direction D1 of the user terminal 200 and the vertical direction G1 and the second angle θ2 between the indicating direction D2 on the bottom surface and the front direction F of the mobile robot 100 to determine the indicating direction D1 of the user terminal 200.

A method of determining the first angle θ1 may be the same as operation 1020 illustrated in FIG. 13, and a method of determining the second angle θ2 may be the same as operation 1030 illustrated in FIG. 13.

The mobile robot 100 may determine the target position T (1270).

The mobile robot 100 may determine the coordinates (xT, yT, 0) of the target position T based on the coordinates (x1, y1, z1) of the user terminal 200, the first angle θ1, and the second angle θ2.

The method of determining the target position T may be the same as operation 1040 illustrated in FIG. 13.

The mobile robot 100 may move toward the target position T (1280).

The mobile robot 100 may generate the path to the target position T and control the driver 140 to move along the generated path.

As described above, the user U may call the mobile robot 100 so that the mobile robot 100 can more accurately determine the target position T, and then designate the target position T. When the call signal is received, the mobile robot 100 may move toward the user terminal 200. When the target position designation signal is received, the mobile robot 100 may move toward the target position T.

Figure 19:
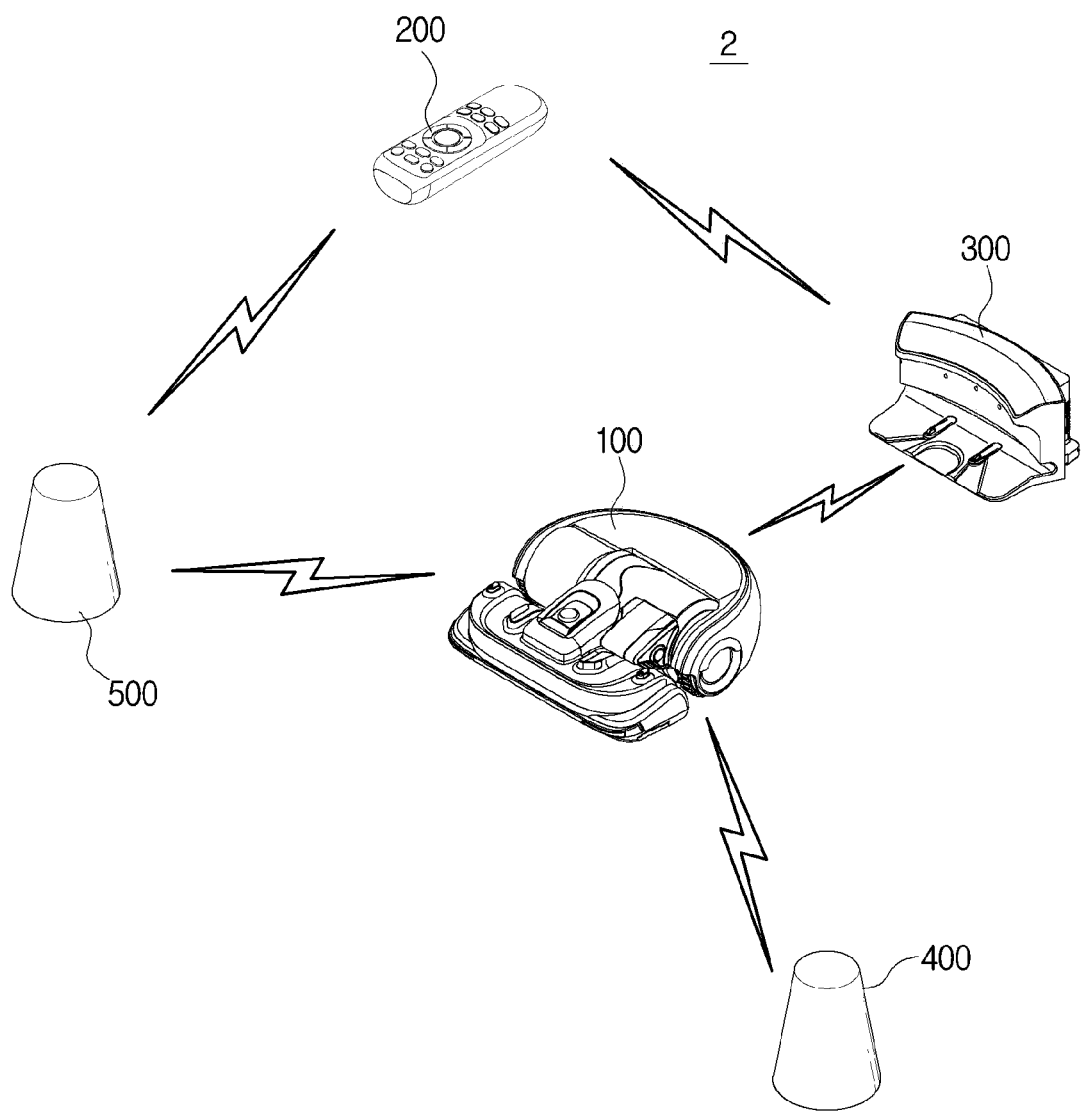
FIG. 19 is a view illustrating a mobile robot system according to an embodiment.

FIG. 19 is a view illustrating a mobile robot system according to an embodiment.

Referring to FIG. 19, a mobile robot system 2 may include the mobile robot 100 driving on the floor, the user terminal 200 controlling the driving of the mobile robot 100, a charging station 300 charging the mobile robot 100, and a first beacon 400 and a second beacon 500 in communication with the mobile robot 100 and the user terminal 200.

The mobile robot 100 may drive on the floor of the driving space. The mobile robot 100 may be the same as the mobile robot 100 described with reference to FIG. 1.

The user terminal 200 may receive the user input of the user U and transmit the user control signal corresponding to the user input to the mobile robot 100. The user terminal 200 may be the same as the user terminal 200 described with reference to FIG. 1.

The charging station 300 may charge a battery for supplying power to the components of the mobile robot 100 and empty the dust box for storing the dust. The charging station 300 may be installed at any position within the driving space.

In addition, the charging station 300 may exchange the data with the mobile robot 100 and the user terminal 200. For example, the charging station 300 may exchange the UWB wireless signal with the mobile robot 100 to determine the position of the mobile robot 100, and may exchange the UWB wireless signal to determine the position of the user terminal 200.

The first beacon 400 and the second beacon 500 may exchange the data with the mobile robot 100 and the user terminal 200, respectively. For example, the first beacon 400 and the second beacon 500 may exchange the UWB wireless signal with the mobile robot 100 to determine the position of the mobile robot 100, respectively, and may exchange the UWB wireless signal with the user terminal 200 to determine the position of the user terminal 200.

As such, the mobile robot 100 may communicate with the charging station 300, the first beacon 400, and the second beacon 500 to determine the position of the mobile robot 100. In addition, the user terminal 200 may communicate with the charging station 300, the first beacon 400, and the second beacon 500 to determine the position of the user terminal 200 and the indicating direction of the user terminal 200.

The mobile robot 100 may determine the target position T indicated by the user terminal 200 based on the position of the mobile robot 100, the position of the user terminal 200, and the indicating direction of the user terminal 200.

Figure 20:
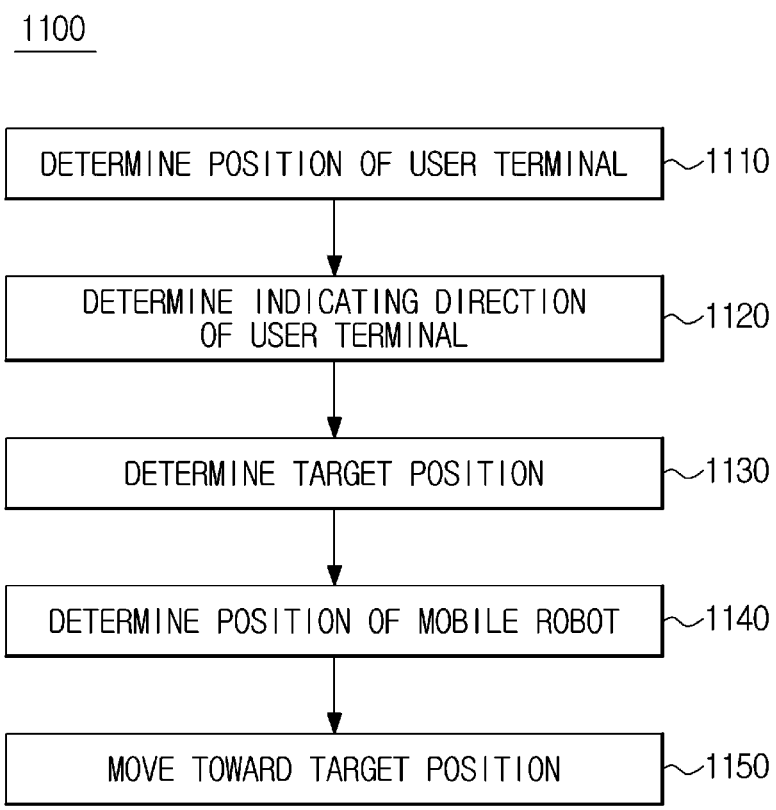
FIG. 20 is a view illustrating a method in which a mobile robot determines a target position according to an embodiment.
Figure 21:
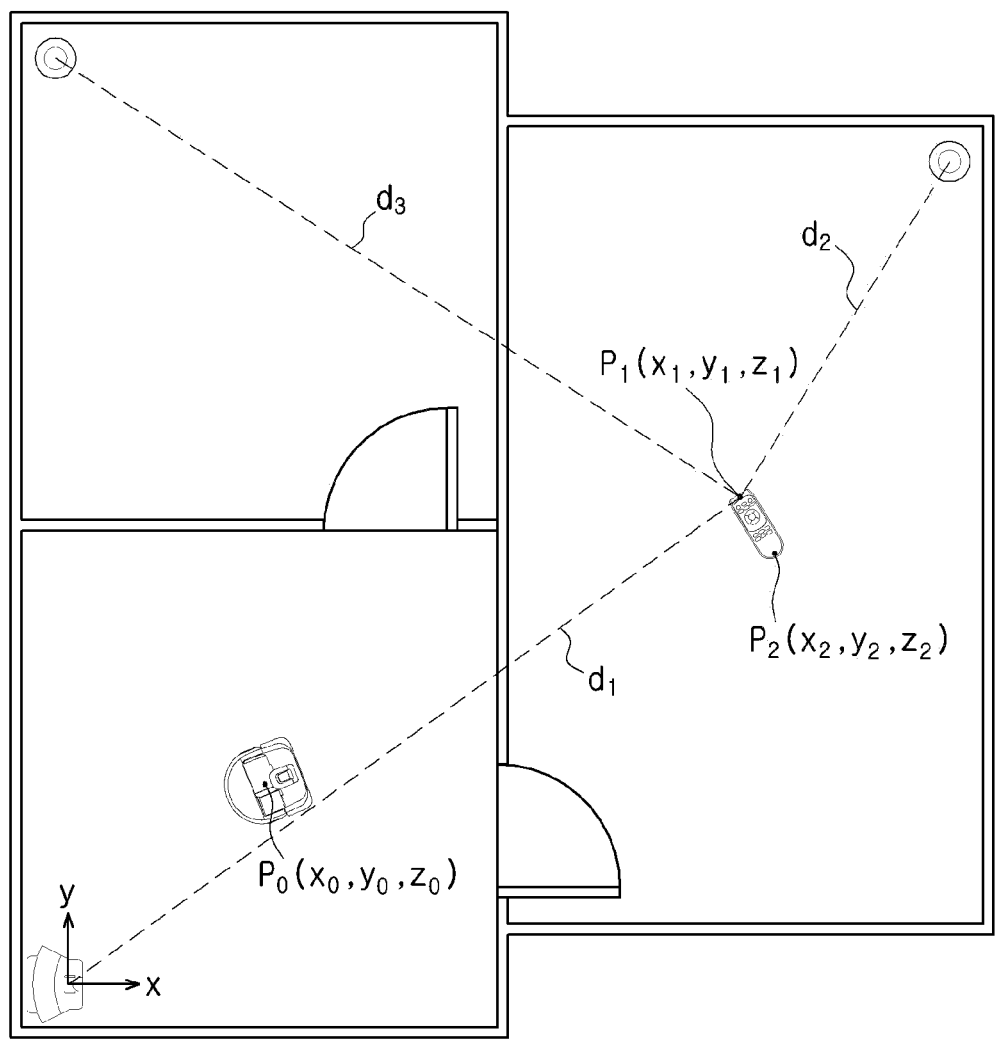
FIG. 21 is a view illustrating an example of determining a position of a user terminal according to an embodiment.
Figure 22:
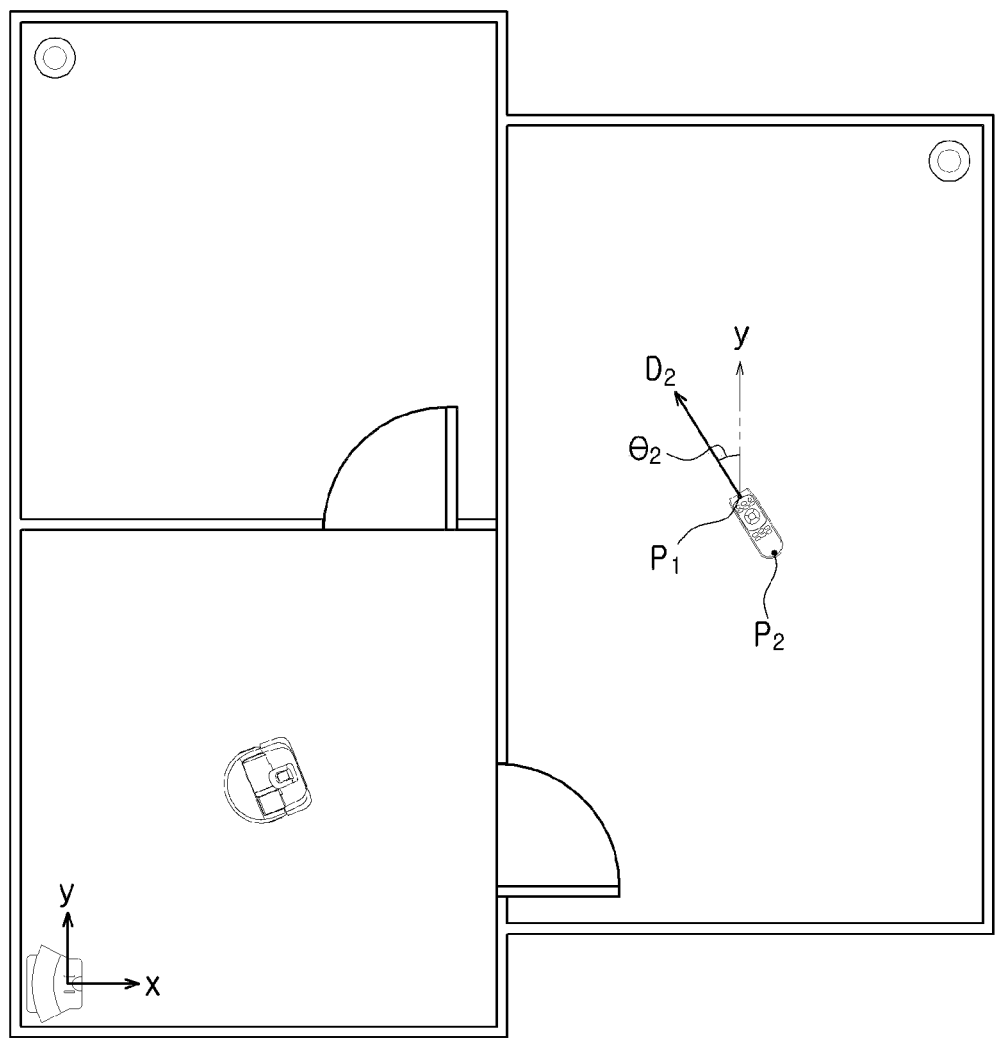
FIG. 22 is a view illustrating an example of determining an indication direction of a user terminal according to an embodiment.

FIG. 20 is a view illustrating a method in which a mobile robot determines a target position according to an embodiment. FIG. 21 is a view illustrating an example of determining a position of a user terminal according to an embodiment. FIG. 22 is a view illustrating an example of determining an indication direction of a user terminal according to an embodiment.

Referring to FIGS. 20, 21, and 22, a method 1110 for determining a target position of the mobile robot 100 is described.

The mobile robot 100 may obtain the position P1 of the user terminal 200 (1110).

The position P1 of the user terminal 200 may represent coordinates in a coordinate system having a reference point (for example, a position of the charging station) as an origin. The coordinate system may be an absolute coordinate system which is not changed by the position or movement of the mobile robot 100.

The user terminal 200 may communicate with each of the charging station 300, the first beacon 400, and the second beacon 500 through the first terminal transceiver 231a, and may determine the position P1 of the user terminal 200 using communication with each of the charging station 300, the first beacon 400, and the second beacon 500.

The user terminal 200 may exchange the UWB wireless signal with each of the charging station 300, the first beacon 400, and the second beacon 500 through the first terminal transceiver 231a. The distance between each of the charging station 300, the first beacon 400, the second beacon 500, and the first terminal transceiver 231a may be determined based on the propagation time of the UWB wireless signal. In addition, the user terminal 200 may determine the position P1 of the user terminal 200 based on the distance between each of the charging station 300, the first beacon 400, and the second beacon 500 and the first terminal transceiver 231a.

For example, as illustrated in FIG. 21, the user terminal 200 may transmit the detection signal through the first terminal transceiver 231a, and the charging station 300 may transmit the response signal in response to the detection signal. The user terminal 200 may receive the response signal of the charging station 300 through the first terminal transceiver 231a, and may determine the first distance d1 between the first terminal transceiver 231a and the charging station 300 based on the response time interval between the transmission of the detection signal and the reception of the response signal.

In addition, the user terminal 200 may determine the second distance d2 between the first terminal transceiver 231a and the first beacon 400 through the communication of the first beacon 400, and may determine the third distance d3 between the first terminal transceiver 231a and the second beacon 500 through the communication of the second beacon 500.

The user terminal 200 may determine the coordinates (x1, y1, z1) (exactly, coordinates of the first terminal transceiver) of the user terminal 200 from the distances d1, d2, and d3 between each of the charging station 300, the first beacon 400, and the second beacon 500 and the first terminal transceiver 231a, and may transmit information about the position P1 of the user terminal 200 to the mobile robot 100. The mobile robot 100 may determine the position P1 of the user terminal 200 from the information about the position P1 of the user terminal 200.

In addition, the user terminal 200 may transmit information regarding the distances d1, d2, and d3 between each of the charging station 300, the first beacon 400, and the second beacon 500 and the first terminal transceiver 231a. The mobile robot 100 may determine the position P1 of the user terminal 200 based on the distances d1, d2, and d3 between each of the charging station 300, the first beacon 400, and the second beacon 500 and the first terminal transceiver 231a.

The mobile robot 100 may obtain the indicating direction D1 of the user terminal 200 (1120).

The indicating direction D1 of the user terminal 200 may represent the first angle θ1 between the indicating direction D1 of the user terminal 200 and the second angle θ2 between the indicating direction D2 on the bottom surface and the +y-axis direction.

In order to determine the first angle θ1, the user terminal 200 may determine the posture of the user terminal 200 using the terminal acceleration sensor 221. The terminal acceleration sensor 221 may determine the posture of the user terminal 200 based on the change in the direction of the gravity acceleration.

The user terminal 200 may determine the tilting of the user terminal 200 from the output of the terminal acceleration sensor 221, that is, the first angle θ1 between the indicating direction D1 and the vertical direction G1 of the user terminal 200. In addition, the user terminal 200 may transmit information about the first angle θ1 to the mobile robot 100 through the terminal communication interface 230.

In order to determine the second angle θ2, the user terminal 200 may determine the position P2 of the second terminal transceiver 231b as illustrated in FIG. 22. The position P2 of the second terminal transceiver 231b may represent coordinates in the coordinate system having the reference point (for example, the position of the charging station) as the origin.

The user terminal 200 may communicate with each of the charging station 300, the first beacon 400, and the second beacon 500 through the second terminal transceiver 231b, and may determine the distance between each of the charging station 300, the first beacon 400, and the second beacon 500 and the second terminal transceiver 231b.

The user terminal 200 may determine the coordinates (x2, y2, z2) of the second terminal transceiver 231b based on the distance between each of the charging station 300, the first beacon 400, and the second beacon 500 and the second terminal transceiver 231b, and may determine the first angle θ1 and the second angle θ2 indicating the indicating direction D1 of the user terminal 200 based on the coordinates (x1, y1, z1) of the first terminal transceiver 231a and the coordinates (x2, y2, z2) of the second terminal transceiver 231b. The user terminal 200 may transmit information about the second angle θ2 to the mobile robot 100 through the terminal communication interface 230, and the mobile robot 100 may determine the first angle θ1 and the second angle θ2 indicating the indicating direction D1 of the user terminal 200 from information about the first angle θ1 and information about the second angle θ2 from the user terminal 200.

In addition, the user terminal 200 may transmit information regarding the distance between each of the charging station 300, the first beacon 400, and the second beacon 500 and the second terminal transceiver 231b. The mobile robot 100 may determine the coordinates (x2, y2, z2) of the second terminal transceiver 231b based on the distance between each of the charging station 300, the first beacon 400, and the second beacon 500 and the second terminal transceiver 231b, and may determine the second angle Θ2 based on the coordinates (x1, y1, z1) of the first terminal transceiver 231a and the coordinates (x2, y2, z2) of the second terminal transceiver 231b.

The mobile robot 100 may determine the target position T indicated by the user terminal 200 (1130).

The mobile robot 100 may determine the coordinates (xT, yT, 0) of the target position T based on the coordinates (x1, y1, z1) of the user terminal 200, the first angle Θ1, and the second angle Θ2. For example, the x-axis coordinate xT and the y-axis coordinate yT of the target position T may be calculated by [Equation 1] and [Equation 2] described above, respectively.

The mobile robot 100 may obtain the position P0 of the mobile robot 100 (1140).

The position P0 of the mobile robot 100 may represent coordinates in the coordinate system having the reference point (for example, the position of the charging station) as the origin.

The mobile robot 100 may communicate with each of the charging station 300, the first beacon 400, and the second beacon 500 through the robot transceiver 161, and may determine the position P0 of the mobile robot 100 using communication with each of the charging station 300, the first beacon 400, and the second beacon 500.

The mobile robot 100 may exchange the UWB wireless signal with each of the charging station 300, the first beacon 400, and the second beacon 500 through the robot transceiver 161, and may determine the distance between each of the charging station 300, the first beacon 400, and the second beacon 500 and the robot transceiver 161 based on the propagation time of the UWB wireless signal. In addition, the mobile robot 100 may determine coordinates (x0, y0, 0) of the mobile robot 100 based on the distance between the charging station 300, the first beacon 400, and the second beacon 500 and the robot transceiver 161.

The mobile robot 100 may move toward the target position T (1150).

The mobile robot 100 may generate the path from the mobile robot 100 to the target position T based on the position P0 of the mobile robot 100 and the target position T, and may move toward the target position T along the generated path.

In addition, the mobile robot 100 may update the position of the mobile robot 100 during the movement toward the target position T.

As described above, the mobile robot 100 and the user terminal 200 may determine the position P0 of the mobile robot 100, the position P1 of the user terminal 200, and the indicating direction D1 of the user terminal 200 through communication with the charging station 300, the first beacon 400, and the second beacon 500. In addition, the mobile robot 100 may determine the target position T based on the position P1 of the user terminal 200 and the indicating direction D1 of the user terminal 200.

Meanwhile, the disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

Embodiments and examples of the disclosure have thus far been described with reference to the accompanying drawings. It will be obvious to those of ordinary skill in the art that the disclosure may be practiced in other forms than the embodiments as described above without changing the technical idea or essential features of the disclosure. The above embodiments are only by way of example, and should not be interpreted in a limited sense.

The invention claimed is:

1. A mobile robot moving to a target position indicated by a user terminal, the mobile robot comprising:
   a driver configured to move the mobile robot;
   a communication interface configured to exchange a wireless signal with each of a first terminal transceiver and a second terminal transceiver included in the user terminal; and
   a controller configured to control the driver to move to the target position after transmission and reception of the wireless signal with the first terminal transceiver and transmission and reception of the wireless signal with the second terminal transceiver,
   wherein the controller is configured to determine the target position based on a communication response time of the first terminal transceiver and a communication response time of the second terminal transceiver, and to control the driver to move to the target position.

2. The mobile robot according to claim 1, wherein the controller is configured to determine a position of the user terminal and an indicating direction of the user terminal based on the communication response time of the first terminal transceiver and the communication response time of the second terminal transceiver, and to determine the target position based on the position of the user terminal and the indicating direction of the user terminal.

3. The mobile robot according to claim 2, wherein the controller is configured to determine the position of the first terminal transceiver based on the communication response time of the first terminal transceiver, to determine the position of the second terminal transceiver based on the communication response time of the second terminal transceiver, and to determine the position of the user terminal and the indicating direction of the user terminal based on the position of the first terminal transceiver and the position of the second terminal transceiver.

4. The mobile robot according to claim 3, wherein the communication interface comprises a first robot transceiver, a second robot transceiver, and a third robot transceiver, and
   wherein the controller is configured to determine the position of the first terminal transceiver based on a communication response time between each of the first, second, and third robot transceivers and the first terminal transceiver, and to determine the position of the second terminal transceiver based on a communication response time between each of the first, second, and third robot transceivers and the second terminal transceiver.

5. The mobile robot according to claim 3, wherein the communication interface comprises a first robot transceiver, and
   wherein the controller is configured to determine the position of the first terminal transceiver based on a communication response time between the first robot transceiver and the first terminal transceiver while the mobile robot turns in the same place, and to determine the position of the second terminal transceiver based on a communication response time between the first robot transceiver and the second terminal transceiver while the mobile robot turns in the same place.

6. The mobile robot according to claim 1, wherein the communication interface comprises a first robot transceiver, a second robot transceiver, and a third robot transceiver, and
   wherein the controller is configured to determine the target position based on a communication response time between each of the first, second, and third robot transceivers and the first terminal transceiver and a communication response time between each of the first, second, and third robot transceivers and the second terminal transceiver.

7. The mobile robot according to claim 1, wherein the communication interface comprises a first robot transceiver, and
   wherein the controller is configured to determine the target position based on a communication response time between the first robot transceiver and the first terminal transceiver and a communication response time between the first robot transceiver and the second terminal transceiver while the mobile robot turns in the same place.

8. A method of controlling a mobile robot for moving the mobile robot to a target position indicated by a user terminal, the method comprising:
   exchanging interface wireless signals with each of a first terminal transceiver and a second terminal transceiver included in the user terminal;
   determining the target position based on a communication response time of the first terminal transceiver and a communication response time of the second terminal transceiver;
   moving the mobile robot to the target position; and
   wherein the determining of the target position comprises:
   determining a position of the user terminal and an indicating direction of the user terminal based on the communication response time of the first terminal transceiver and the communication response time of the second terminal transceiver; and
   determining the target position based on the position of the user terminal and the indicating direction of the user terminal.

9. The method according to claim 8, wherein the determining of the position of the user terminal and the indicating direction of the user terminal comprises:
- determining the position of the first terminal transceiver based on the communication response time of the first terminal transceiver;
- determining the position of the second terminal transceiver based on the communication response time of the second terminal transceiver; and
- determining the position of the user terminal and the indicating direction of the user terminal based on the position of the first terminal transceiver and the position of the second terminal transceiver.

10. The method according to claim 9, wherein the determining of the position of the first terminal transceiver comprises determining the position of the first terminal transceiver based on a communication response time between each of first, second, and third robot transceivers included in the mobile robot and the first terminal transceiver, and
- wherein the determining of the position of the second terminal transceiver comprises determining the position of the second terminal transceiver based on a communication response time between each of the first, second, and third robot transceivers included in the mobile robot and the second terminal transceiver.

11. The method according to claim 9, wherein the determining of the position of the first terminal transceiver comprises determining the position of the first terminal transceiver based on a communication response time between a first robot transceiver included in the mobile robot and the first terminal transceiver while the mobile robot turns in the same place, and
- wherein the determining of the position of the second terminal transceiver comprises determining the position of the second terminal transceiver based on a communication response time between the first robot transceiver and the second terminal transceiver while the mobile robot turns in the same place.

12. The method according to claim 8, wherein the determining of the target position comprises:
- determining the target position based on a communication response time between each of first, second, and third robot transceivers included in the mobile robot and the first terminal transceiver and a communication response time between each of the first, second, and third robot transceivers and the second terminal transceiver.

13. The method according to claim 8, wherein the determining of the target position comprises:
- determining the target position based on a communication response time between a first robot transceiver included in the mobile robot and the first terminal transceiver and a communication response time between the first robot transceiver and the second terminal transceiver while the mobile robot turns in the same place.

* * * * *